United States Patent
Yamamoto et al.

(10) Patent No.: US 10,693,562 B2
(45) Date of Patent: Jun. 23, 2020

(54) ENCODING DEVICE AND DECODING DEVICE

(71) Applicant: NIPPON TELEGRAPH AND TELEPHONE CORPORATION, Tokyo (JP)

(72) Inventors: Shuto Yamamoto, Yokosuka (JP); Akira Masuda, Yokosuka (JP); Yoshiaki Sone, Yokosuka (JP); Mitsunori Fukutoku, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/340,658

(22) PCT Filed: Oct. 16, 2017

(86) PCT No.: PCT/JP2017/037353
§ 371 (c)(1),
(2) Date: Apr. 9, 2019

(87) PCT Pub. No.: WO2018/074412
PCT Pub. Date: Apr. 26, 2018

(65) Prior Publication Data
US 2020/0052792 A1    Feb. 13, 2020

(30) Foreign Application Priority Data

Oct. 18, 2016 (JP) ................... 2016-204411

(51) Int. Cl.
*H04B 10/54* (2013.01)
*H04J 14/02* (2006.01)
(Continued)

(52) U.S. Cl.
CPC .............. *H04B 10/54* (2013.01); *H04J 14/02* (2013.01); *H04B 10/50* (2013.01); *H04B 10/516* (2013.01); *H04B 10/548* (2013.01)

(58) Field of Classification Search
CPC ...... H04B 10/54; H04B 10/548; H04B 10/50; H04B 10/00; H04B 10/06; H04B 10/12;
(Continued)

(56) References Cited

U.S. PATENT DOCUMENTS 4,055,756 A    10/1977 Jolivet et al.
6,025,944 A *  2/2000 Mendez ............. H04J 14/005
                                              398/1

(Continued)

FOREIGN PATENT DOCUMENTS

JP    2011-029698 A    2/2011
JP    2011-101475 A    5/2011
(Continued)

OTHER PUBLICATIONS

A. Masuda, et al., "First Experimental demonstration of signal performance improvement by the Walsh-Hadamard transform for the super-channel transmission," Proc. of Opto-Electronics and Communications Conference (OECC), 2015.
(Continued)

*Primary Examiner* — Abbas H Alagheband
(74) *Attorney, Agent, or Firm* — Harness, Dickey & Pierce, P.L.C.

(57) ABSTRACT

An encoding device includes an encoding unit, DA converters, light sources, intensity modulators, and wavelength multiplexers. The encoding unit adds (NM/2) to an encoded signal having a negative minimum value in a range of the encoded signal among encoded signals of N channels of (NM+1) values obtained by calculating an inner product of a Hadamard matrix of N rows and N columns and a matrix
(Continued)

having elements of N intensity signals of (M+1) values. The DA converters of the channels convert the encoded signals of the channels from digital signals into electrical analog signals. The light sources output light of wavelengths for use in the channels. The light intensity modulators of the channels intensity-modulate the light output from the light sources with the encoded signals converted into the electrical analog signals by the DA converters. The wavelength multiplexer outputs a wavelength-multiplexed signal obtained by wavelength-multiplexing the light intensity-modulated by the light intensity modulators.

4 Claims, 12 Drawing Sheets

(51) Int. Cl.
 *H04B 10/548* (2013.01)
 *H04B 10/516* (2013.01)
 *H04B 10/50* (2013.01)

(58) Field of Classification Search
 CPC ....... H04B 10/04; H04B 10/516; H04J 14/02; H04J 14/00; H04J 14/08; H04J 13/12; H04J 13/18; H04L 9/00; G01J 3/427; G01J 3/10; G01J 3/28; G01N 21/35; H04K 1/04
 USPC ........................................................... 398/79
 See application file for complete search history.

(56) References Cited

U.S. PATENT DOCUMENTS

| | | | | | |
|---|---|---|---|---|---|
| 7,139,491 | B2* | 11/2006 | Katagiri | ................. | H04B 10/85 398/195 |
| 7,555,216 | B2* | 6/2009 | Yoshino | ............... | H04B 10/548 398/193 |
| 8,831,426 | B2* | 9/2014 | Etemad | ................. | H04K 1/006 380/255 |
| 10,594,520 | B2 | 3/2020 | Chiskis et al. | | |
| 2005/0091051 | A1 | 4/2005 | Moriya et al. | | |
| 2005/0107053 | A1 | 5/2005 | De Courville et al. | | |
| 2006/0147219 | A1* | 7/2006 | Yoshino | ............... | H04B 10/548 398/183 |
| 2006/0176973 | A1 | 8/2006 | Alamouti et al. | | |
| 2008/0107429 | A1* | 5/2008 | Galli | .................... | H04B 10/505 398/188 |
| 2009/0110033 | A1 | 4/2009 | Shattil | | |
| 2010/0067922 | A1* | 3/2010 | Menendez | ............ | H04J 14/007 398/182 |
| 2010/0091990 | A1* | 4/2010 | Etemad | ................. | H04J 14/005 380/256 |
| 2010/0183309 | A1* | 7/2010 | Etemad | ................ | H04B 10/505 398/79 |
| 2011/0097079 | A1* | 4/2011 | Hanawa | ............... | H04J 11/0033 398/25 |
| 2013/0272705 | A1* | 10/2013 | Rekaya-Ben Othman | ................. | H04B 10/506 398/65 |
| 2014/0376925 | A1* | 12/2014 | Koike-Akino | ...... | H03M 13/251 398/188 |
| 2016/0006532 | A1* | 1/2016 | Chang | ................. | G01S 13/9303 398/79 |
| 2016/0080102 | A1* | 3/2016 | Fang | ...................... | H04J 14/005 398/74 |
| 2016/0119078 | A1* | 4/2016 | Kakande | ................. | H04J 14/06 398/65 |
| 2016/0226625 | A1* | 8/2016 | Millar | ................... | H04L 1/0041 |
| 2017/0078044 | A1* | 3/2017 | Hino | ................... | H04B 10/516 |
| 2018/0262243 | A1* | 9/2018 | Ashrafi | ................ | H04B 7/0456 |
| 2019/0137337 | A1* | 5/2019 | Ridder | ...................... | G01J 3/10 |

FOREIGN PATENT DOCUMENTS

| | | | | |
|---|---|---|---|---|
| JP | 2014-107734 A | 6/2014 | | |
| JP | 2014107734 | * | 9/2014 | ........... H04B 10/516 |

OTHER PUBLICATIONS

International Search Report (English and Japanese) and Written Opinion (in Japanese) issued in International Application No. PCT/JP2017/037353, dated Jan. 9, 2018; ISA/JP.
Notice of Allowance from counterpart U.S. Appl. No. 16/842,117, dated Apr. 30, 2020.

* cited by examiner

ENCODING DEVICE AND DECODING DEVICE

CROSS-REFERENCE TO RELATED APPLICATIONS

This application is a 371 U.S. National Stage of International Application No. PCT/JP2017/037353, filed on Oct. 16, 2017, which claims priority to Japanese Application No. 2016-204411, filed on Oct. 18, 2016. The entire disclosures of the above applications are incorporated herein by reference.

TECHNICAL FIELD

The present invention relates to an an encoding device and a decoding device.

BACKGROUND ART

Due to an increase in data communication demand, optical signal modulation technology for enabling the transmission of a large volume of traffic and optical transmission networks using optical signal multiplexing technology are becoming widespread. In particular, 100 Gigabit Ethernet (GbE) LR-4 (long range) that is one scheme of Ethernet (registered trademark) is known as a high-speed optical transmission technology for a short distance. A transmission scheme in 100 GbE LR-4 uses multi-channel optical transmission in which a data transmission of 100 Gbps (bps: bits per second) is performed by using optical signals having a plurality of different wavelengths. For example, in 100 GbE LR-4, a data transmission of 100 Gbps is implemented by performing a data transmission of 25 Gbps on each of four wavelengths (each wavelength is referred to as a channel). The majority of schemes using a wavelength of a 1.3 μm band are used in Ethernet (registered trademark) and the 1.3 μm band is also used in 100 GbE LR-4. Because a zero-dispersion wavelength of a single-mode fiber is approximately 1.3 μm, there is an advantage that it is not necessary to consider waveform degradation due to wavelength dispersion in optical transmission using the 1.3 μm band.

CITATION LIST

Non-Patent Literature

[Non-Patent Document 1]
A. Masuda, et al., "First Experimental demonstration of signal performance improvement by the Walsh-Hadamard transform for the super-channel transmission," Proc. of Opto-Electronics and Communications Conference (OECC), 2015

SUMMARY OF INVENTION

Technical Problem

Considering that a data transmission of 1 Tbps will be implemented by applying Ethernet (registered trademark) technology in the future, for example, there is a conceivable method that the data transmission of 1 Tbps is implemented by performing a data transmission of 100 Gbps on each channel by using 10 wavelengths. When this method is used, the number of channels to be used is 10. Because it is general to use 800 GHz as a frequency interval for channels in Ethernet (registered trademark), a wavelength range occupied by 10 channels is about 60 nm. For example, if a zero-dispersion wavelength of the transmission fiber is 1310 nm and a wavelength of a longest-wave channel is 1310 nm in accordance with the zero-dispersion wavelength, the wavelength of a shortest-wave channel is approximately 1250 nm.

Because a dispersion slope of a normal single-mode fiber is approximately 0.08 ps/nm²/km, wavelength dispersion at 1250 nm is approximately 5 ps/nm/km. Assuming that a transmission distance in accordance with 100 GbE LR-4 is 10 km, cumulative wavelength dispersion in the channel on the shortest-wavelength side is about 50 ps/nm. That is, a waveform in the shortest-wave channel degrades due to the wavelength dispersion of 50 ps/nm.

An influence of wavelength dispersion on waveform degradation depends on the transmission rate of a channel. Therefore, the higher the transmission rate is used, the more a waveform degrades. Assuming such a situation, also in the optical transmission system using the 1.3 μm band, the influence of wavelength dispersion cannot be ignored. Particularly, in a short-distance optical transmission system, because intensity modulation is assumed to be used from the viewpoint of cost reduction, it is not possible to perform dispersion compensation in a receiver such as a digital coherent optical transmission system. Therefore, the wavelength dispersion of a transmission fiber directly affects the quality of an optical signal.

Considering that the number of channels of 100 GbE LR-4 is 4 and 10 channels are necessary to implement 1 terabit Ethernet (TbE), light having a shorter wavelength than that of 100 GbE LR-4 is required to be generated. Therefore, it is assumed that a technically immature light-emitting device, which has not been proven so far, will be required to be used. At this time, there is concern that sufficient transmission power cannot be obtained at a short-wave side compared with a long-wave side. Also, because the technology is assumed to be immature in an optical device such as wavelength multiplexer/demultiplexer used in a system, there is a possibility that large loss occurs at the short-wave side. This means that the reception power of the short-wave side becomes smaller than the reception power of the long-wave side, and the signal quality of a channel on the short-wave side becomes lower than that of a channel on the long-wave side. The above situation is schematically shown in FIG. 16.

In view of such a situation, in implementing future short-distance optical transmission technology such as 1-Tbps data transmission, variation in signal quality among channels may be a main cause of degradation of the signal quality of the entire optical transmission system.

In view of the above circumstances, an objective of the present invention is to provide an encoding device and a decoding device capable of reducing variation in signal quality between channels in an optical transmission system and improving signal quality.

Solution to Problem

According to a first aspect of the present invention, there is provided an encoding device, including: an encoding unit configured to perform an encoding process of inputting N intensity signals (N is an integer greater than or equal to 2) of (M+1) values (M is an integer greater than or equal to 1) and adding (NM/2) to an encoded signal having a negative minimum value in a range of the encoded signal among encoded signals of N channels of (NM+1) values obtained by calculating an inner product of a Hadamard matrix of N rows and N columns and a matrix having elements of the N intensity signals; N digital-to-analog conversion units corresponding to the N channels and configured to convert the encoded signals of the N channels from digital signals into electrical analog signals; N light sources corresponding to the N channels and configured to output light of wavelengths for use in the N channels; N light intensity modulation units corresponding to the N channels and configured to intensity-modulate the light output from the N light sources with the encoded signals converted into the electrical analog signals by the N digital-to-analog conversion units; and a wavelength multiplexing unit configured to output a wavelength-multiplexed signal obtained by wavelength-multiplexing the light intensity-modulated by the N light intensity modulation units.

According to a second aspect of the present invention, there is provided an encoding device, including: an encoding unit configured to perform an encoding process of inputting N intensity signals (N is an integer greater than or equal to 2) of (M+1) values (M is an integer greater than or equal to 1) and adding ($2^L$M/2) (L is an integer less than or equal to 1 and $2^L$ is less than or equal to N) to an encoded signal having a negative minimum value in a range of the encoded signal among encoded signals of $2^L$ channels of ($2^L$M+1) values obtained by calculating an inner product of a Hadamard matrix of $2^L$ rows and $2^L$ columns and a matrix having elements of $2^L$ intensity signals included in a set for each set of $2^L$ intensity signals and generate encoded signals of N channels; N digital-to-analog conversion units corresponding to the N channels and configured to convert the encoded signals of the N channels from digital signals into electrical analog signals; N light sources corresponding to the N channels and configured to output light of wavelengths for use in the N channels; N light intensity modulation units corresponding to the N channels and configured to intensity-modulate the light output from the N light sources with the encoded signals converted into the electrical analog signals by the N digital-to-analog conversion units; and a wavelength multiplexing unit configured to output a wavelength-multiplexed signal obtained by wavelength-multiplexing the light intensity-modulated by the N light intensity modulation units.

According to a third aspect of the present invention, in the encoding device according to the second aspect, the $2^L$ intensity signals included in each set of intensity signals are selected so that variation in an average value of signal qualities of the $2^L$ intensity signals included in each set of intensity signals is minimized.

According to a fourth aspect of the present invention, in the encoding device according to the second aspect, if L=1, an $i^{th}$ set (i is an integer greater than or equal to 1 and less than or equal to N/2) among sets of signal intensities includes the intensity signal having $i^{th}$ highest signal quality and the intensity signal having $i^{th}$ lowest signal quality among the N intensity signals.

According to a fifth aspect of the present invention, there is provided a decoding device, including: a wavelength demultiplexing unit configured to demultiplex a received wavelength-multiplexed signal into optical signals of N channels on the basis of wavelengths; N light receiving units corresponding to the N channels and configured to convert the optical signals of the N channels among the optical signals of the N channels obtained through demultiplexing performed by the wavelength demultiplexing unit into intensity signals which are electrical signals of (NM+1) values (M is an integer greater than or equal to 1); N analog-to-digital co version units corresponding to the N channels and configured to convert the intensity signals of the N channels from analog signals into digital signals; and a decoding unit configured to perform a decoding process of obtaining N decoded signals of (M+1) values by adding (−M(N−1)/2) to a decoded signal having a positive minimum value in a range of the decoded signal among decoded signals obtained by dividing an inner product of a Hadamard matrix of N rows and N columns and a matrix having elements of the intensity signals converted into the digital signals by the N analog-to-digital conversion units by N and adding (M/2) to a decoded signal having a negative minimum value in the range of the decoded signal.

According to a sixth aspect of the present invention, in the decoding device according to the above-described fifth aspect, the decoding unit includes N filter units corresponding to the N channels and including (N+1) adaptive digital filters; and N determination function units corresponding to the N channels, and, when the intensity signal of an $i^{th}$ channel (i is an integer greater than or equal to 1 and less than or equal to N) among the N channels is denoted by $B_i$, a tap coefficient of a $j^{th}$ adaptive digital filter (j is an integer greater than or equal to 0 and less than or equal to N) among the (N+1) adaptive digital filters provided in a filter unit corresponding to the $i^{th}$ channel among the N filter units is denoted by $h_{ij}$, digital data after a process of the filter unit corresponding to the $i^{th}$ channel is denoted by $C_i$, and the Hadamard matrix of N rows and N columns is denoted by $H_N$, the filter unit corresponding to the $i^{th}$ channel calculates digital data $C_i$ according to Equations (27) and (28) of an embodiment, a determination function unit corresponding to the $i^{th}$ channel among the N determination function units decodes a signal by making a threshold value determination on the digital data $C_i$, and an initial value of the tap coefficient $h_{ij}$ is determined by Equations (33) and (34) of an embodiment.

According to a seventh aspect of the present invention, in the decoding device according to the above-described fifth aspect, the decoding unit includes N filter units corresponding to the N channels and including N adaptive digital filters; and N determination function units corresponding to the N channels, and, when the intensity signal of an $i^{th}$ channel (i is an integer greater than or equal to 1 and less than or equal to N) among the N channels is denoted by $B_i$, a tap coefficient of a $j^{th}$ (j is an integer greater than or equal to 1 and less than or equal to N) adaptive digital filter among the N adaptive digital filters provided in a filter unit corresponding to the $i^{th}$ channel among the N filter units is denoted by $h_{ij}$, digital data after a process of the filter unit corresponding to the $i^{th}$ channel is denoted by $C_i$, and the Hadamard matrix of N rows and N columns is denoted by $H_N$, the filter unit corresponding to the $i^{th}$ channel calculates digital data $C_i$ according to Equation (36) of an embodiment, a determination function unit corresponding to the $i^{th}$ channel among the N determination function units decodes a signal by making a threshold value determination on the digital data $C_i$, and an initial value of the tap coefficient $h_{ij}$ is determined by Equation (40) of an embodiment.

According to an eighth aspect of the present invention, in the decoding device according to the above-described sixth or seventh aspect, tap lengths of the N adaptive digital filters are determined on the basis of a maximum wavelength dispersion value among wavelength dispersion values of the N channels.

According to a ninth aspect of the present invention, there is provided a decoding device, including: a wavelength demultiplexing unit configured to demultiplex a received wavelength-multiplexed signal into optical signals of N channels on the basis of wavelengths; N light receiving units corresponding to the N channels and configured to convert the optical signals of the N channels among the optical signals of the N channels obtained through demultiplexing performed by the wavelength demultiplexing unit into intensity signals which are electrical signals of (NM+1) values (M is an integer greater than or equal to 1); N analog-to-digital conversion units corresponding to the N channels and configured to convert the intensity signals of the N channels from analog signals into digital signals; and a decoding unit configured to perform a decoding process of adding (−M $(2^L-1)/2$) (L is an integer greater than or equal to 1 and $2^L$ is less than or equal to N) to a decoded signal having a positive minimum value in a range of the decoded signal among decoded signals obtained by dividing an inner product of a Hadamard matrix of $2^L$ rows and $2^L$ columns and a matrix having elements of $2^L$ intensity signals included in a set of $2^L$ intensity signals by $2^L$ and adding (M/2) to a decoded signal having a negative minimum value in the range of the decoded signal for each set of $2^L$ intensity signals among the intensity signals of the N channels converted into the digital signals by the N analog-to-digital conversion units.

Advantageous Effects of Invention

According to the present invention, it is possible to reduce variation in signal quality between channels in an optical transmission system and improve signal quality.

DESCRIPTION OF EMBODIMENTS

Figure 1:
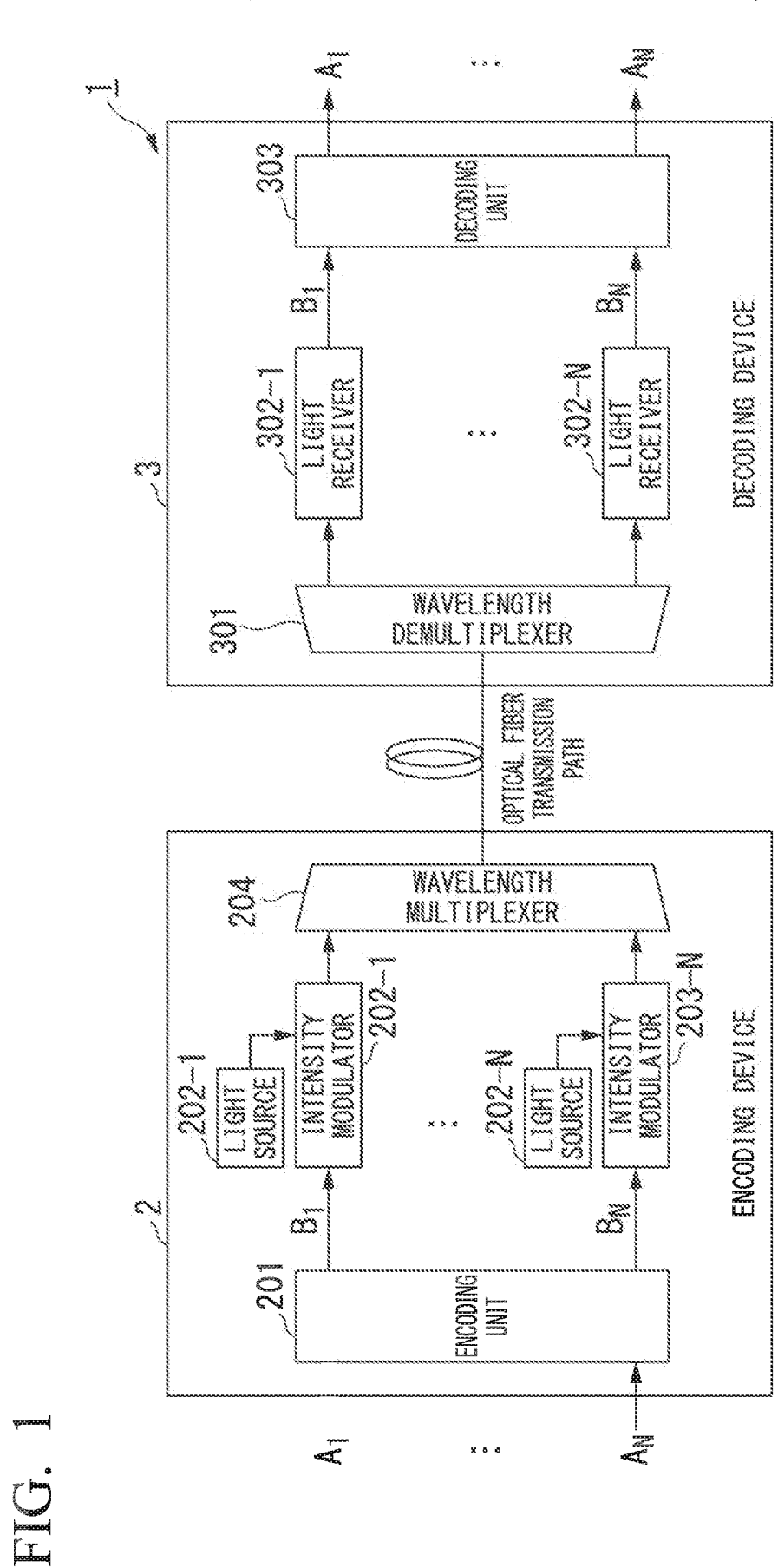
FIG. 1 is a diagram showing a basic configuration of an optical transmission system according to an embodiment of the present invention.

Hereinafter, embodiments of the present invention will be described in detail with reference to the drawings. The embodiments of the present invention are applied to a so-called multi-channel optical transmission system (hereinafter referred to as an "optical transmission system") configured to perform data transmission to and from the same ground by using optical signals with a plurality of different wavelengths.

As a general intensity modulation scheme, a 4-level pulse amplitude modulation (PAM4) scheme is known. By assigning 2-bit data/information to a four-value intensity signal having any one of four values of $\{0, 1, 2, 3\}$, a transmission of 2 bits/symbol (2 bits per symbol) is implemented. In the present embodiment, Walsh encoding is applied to a plurality of PAM4 signals, thereby equalizing variation in signal quality among channels and improving signal quality of the entire optical transmission system.

A procedure of applying conventional Walsh encoding to signals of two channels will be described as follows. This procedure is also described in, for example, Non-Patent Document 1. Assuming that a signal of a first channel before encoding is $A_1$, a signal of a second channel before encoding is $A_2$, a signal of the first channel after encoding is $B_1$, and a signal of the second channel after encoding is $B_2$, a relationship between the signals $A_1$ and $A_2$ and the signals $B_1$ and $B_2$ is represented as shown in the following Equation (1).

[Math. 1]

$$\begin{pmatrix} B_1 \\ B_2 \end{pmatrix} = \begin{pmatrix} 1 & 1 \\ 1 & -1 \end{pmatrix} \begin{pmatrix} A_1 \\ A_2 \end{pmatrix} \qquad (1)$$

In the conventional Walsh code, the signals $A_1$ and $A_2$ are assume to be complex amplitudes of radio waves and optical electric fields. When these signals represent light intensities of two values of 0 and 1, the signals $A_1$ and $A_2$ have either one of two values $\{0, 1\}$, whereas the signal $B_1$ has any one of three values of $\{0, 1, 2\}$ and the signal $B_2$ has any one of three values of $\{-1, 0, 1\}$. When the signals $B_1$ and $B_2$ represent light intensities, it is not possible to have a negative value generally. Therefore, the value of −1 in the signal $B_2$ cannot be represented as a light intensity. Therefore, in the present embodiment, encoding from the signals $A_1$ and $A_2$ into the signals $B_1$ and $B_2$ is changed as shown in the following Equation (2).

[Math. 2]

$$\begin{pmatrix} B_1 \\ B_2 \end{pmatrix} = \begin{pmatrix} 1 & 1 \\ 1 & -1 \end{pmatrix} \begin{pmatrix} A_1 \\ A_2 \end{pmatrix} + \begin{pmatrix} 0 \\ 1 \end{pmatrix} \qquad (2)$$

In this manner, it is possible to represent the signal $B_2$ as a light intensity because the signal $B_2$ also has three values of $\{0, 1, 2\}$ as in the signal $B_1$ by shifting the value of the signal $B_2$ multivalued to the three values of $\{-1, 0, 1\}$ to the positive side so that $-1$ that is a minimum value of the values becomes 0. Assuming that the probabilities that 0 and 1 will appear in the signals $A_1$ and $A_2$ are the same, the average light intensity of the signals $A_1$ and $A_2$ becomes ½. To make the light intensities of the signals $B_1$ and $B_2$ equal to the light intensities of the signals $A_1$ and $A_2$, the encoding is represented as shown in the following Equation (3) when Equation (2) is rewritten by multiplying the right side of Equation (2) by a normalization coefficient ½.

[Math. 3]

$$\begin{pmatrix} B_1 \\ B_2 \end{pmatrix} = \frac{1}{2}\left[\begin{pmatrix} 1 & 1 \\ 1 & -1 \end{pmatrix}\begin{pmatrix} A_1 \\ A_2 \end{pmatrix} + \begin{pmatrix} 0 \\ 1 \end{pmatrix}\right] \quad (3)$$

However, because a light intensity of signal light in the optical transmission system can be adjusted by transmission power, description will be given below without consideration of the normalization of the light intensity during encoding.

Although the signals $A_1$ and $A_2$ have been assumed to be two-value intensity signals having either one of the values of $\{0, 1\}$ so far, it is possible to formulate encoding in a similar procedure even when an $(M+1)$-value intensity signal having any one of general values of $\{0, 1, \ldots, M\}$, i.e., an $(M+1)$-value PAM signal is assumed, wherein M is an integer greater than or equal to 1. In this case, the encoding is shown as the following Equation (4).

[Math. 4]

$$\begin{pmatrix} B_1 \\ B_2 \end{pmatrix} = \begin{pmatrix} 1 & 1 \\ 1 & -1 \end{pmatrix}\begin{pmatrix} A_1 \\ A_2 \end{pmatrix} + \begin{pmatrix} 0 \\ M \end{pmatrix} \quad (4)$$

Although $(M+1)$-value PAM signals of two channels have been assumed so far, it is possible to formulate the encoding in a similar procedure even when $(M+1)$-value PAM signals of N channels are assumed, wherein N is an integer greater than or equal to 2. The encoding is shown as the following Equation (5).

[Math. 5]

$$\begin{pmatrix} B_1 \\ B_2 \\ \vdots \\ B_N \end{pmatrix} = H_N \begin{pmatrix} A_1 \\ A_2 \\ \vdots \\ A_N \end{pmatrix} + \begin{pmatrix} 0 \\ MN/2 \\ \vdots \\ MN/2 \end{pmatrix} \quad (5)$$

Here, a signal $A_i$ (i=1, 2, . . . , N) represents an $(M+1)$-value PAM signal before encoding and a signal $B_i$ (i=1, 2, . . . , N) represents an $(NM+1)$-value PAM signal after encoding. The $(NM+1)$-value PAM signal indicates any one of $(NM+1)$ different values. In Equation (5), a value of the signal $B_i$ (i=2, . . . , N) multivalued according to the conventional Walsh encoding is shifted to the positive side so that the minimum value of the range of the signal $B_i$ becomes 0. Thereby, when the signal $A_i$ has any one of $(M+1)$ values of $\{0, 1, \ldots, M\}$, the signal $B_i$ has any one of $(NM+1)$ values of $\{0, 1, \ldots, NM\}$. In the optical transmission system of the present embodiment, the intensity signals $B_1$ to $B_N$ encoded in this manner are transmitted on channels. Hereinafter, a channel for transmitting the intensity signal $B_i$ is denoted by an $i^{th}$ channel. A matrix $H_N$ is an N×N Hadamard matrix and is represented by the following Equation (6).

[Math. 6]

$$H_N = \begin{pmatrix} H_{N/2} & H_{N/2} \\ H_{N/2} & -H_{N/2} \end{pmatrix}, H_2 = \begin{pmatrix} 1 & 1 \\ 1 & -1 \end{pmatrix} \quad (6)$$

Where N represents a power of 2.

FIG. 1 is a diagram showing a basic configuration of an optical transmission system 1 according to an embodiment of the present invention. The optical transmission system 1 includes an encoding device 2 and a decoding device 3. The encoding device 2 and the decoding device 3 are connected to each other via an optical fiber transmission path.

The encoding device 2 includes an encoding unit 201, light sources 202-1 to 202-N, intensity modulators 203-1 to 203-N and a wavelength multiplexer 204, wherein N is an integer greater than or equal to 2. The encoding unit 201 encodes signals $A_1$ to $A_N$ that are $(M+1)$-value PAM signals according to Equation (5) to generate signals $B_1$ to $B_N$ that are $(NM+1)$-value PAM signals. The encoding unit 201 outputs the generated signals $B_1$ to $B_N$. The light source 202-$i$ (i=1, 2, . . . , N) outputs light having a wavelength for use in an $i^{th}$ channel. The intensity modulator 203-$i$ (i=1, 2, . . . , N) inputs a signal $B_i$ output by the encoding unit 201 and light output by the light source 202-$i$. The intensity modulator 203-$i$ generates an intensity signal by performing optical amplitude modulation of $(NM+1)$ values on the light output by the light source 202-$i$ on the basis of the signal $B_i$. The intensity modulator 203-$i$ outputs the generated intensity signal to the wavelength multiplexer 204. The wavelength multiplexer 204 outputs a wavelength-multiplexed signal obtained by multiplexing the intensity signals $B_1$ to $B_N$ of first to $N^{th}$ channels input from the intensity modulators 203-1 to 203-N to the optical fiber transmission path.

The decoding device 3 includes a wavelength demultiplexer 301, light receivers 302-1 to 302-N and a decoding unit 303, wherein N is an integer greater than or equal to 2. The wavelength demultiplexer 301 demultiplexes the wavelength-multiplexed signal transmitted through the optical fiber transmission path into the optical signals $B_1$ to $B_N$ on the basis of wavelengths and outputs the optical signal $B_i$ of the $i^{th}$ channel (i=1, 2, . . . , N) to the light receiver 302-$i$. The light receiver 302-$i$ (i=1, 2, . . . . N) performs a direct-detection for the optical signal $B_i$ input from the wavelength demultiplexer 301 and converts it into the signal $B_i$ of an electrical signal. The light receiver 302-$i$ outputs the signal $B_i$ converted into the electrical signal to the decoding unit 303. The decoding unit 303 receives the signals $B_1$ to $B_N$ from the light receivers 302-1 to 302-N. The decoding unit 303 restores the signals $A_1$ to $A_N$ before encoding by performing a decoding process represented by the following Equation (7) on the input signals $B_1$ to $B_N$.

[Math. 7]

$$\begin{pmatrix} A_1 \\ A_2 \\ \vdots \\ A_N \end{pmatrix} = \frac{H_N}{N} \begin{pmatrix} B_1 \\ B_2 \\ \vdots \\ B_N \end{pmatrix} + \frac{M}{2}\begin{pmatrix} -(N-1) \\ 1 \\ \vdots \\ 1 \end{pmatrix} \quad (7)$$

Equation (7) is obtained by solving Equation (5) for the signals $A_i$.

As described above, the optical transmission system 1 encodes the intensity signals $A_1$ to $A_N$ and transmits the encoded intensity signals $A_1$ to $A_N$ as the intensity signals $B_1$ to $B_N$ so that one signal $A_i$ is distributed and transmitted on a plurality of channels. Thereby, even when the signal quality of a specific channel significantly deteriorates due to wavelength dispersion or a decrease in reception power, quality degradation is distributed to a plurality of channels according to decoding. Thus, the variation in signal quality among the channels is equalized and signal quality of the entire optical transmission system is improved.

Detailed embodiments of the present invention will be described below.

First Embodiment

In the first embodiment, Walsh encoding is performed on PAM4 signals of two channels.

Figure 2:
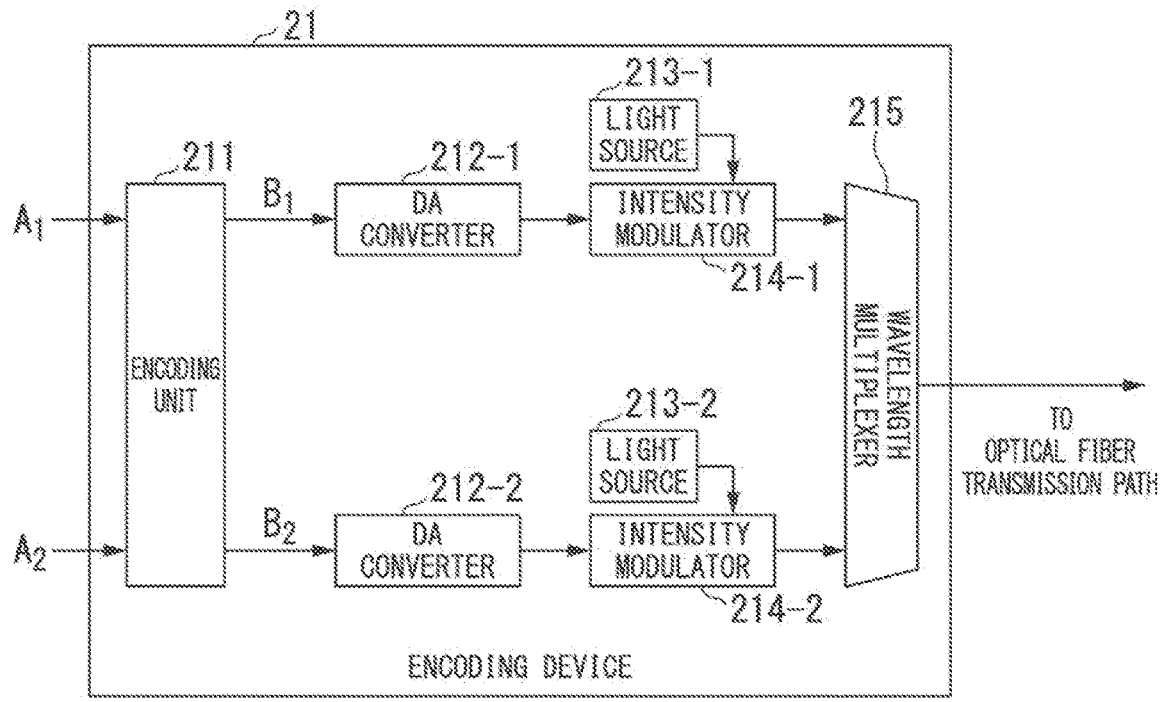
FIG. 2 is a diagram showing a configuration of an encoding device of an optical transmission system according to a first embodiment.

FIG. 2 is a diagram showing a configuration of an encoding device 21 of the optical transmission system according to the first embodiment. The encoding device 21 includes an encoding unit 211, digital-to-analog converters (DA converters) 212-1 and 212-2, light sources 213-1 and 213-2, intensity modulators 214-1 and 214-2, and a wavelength multiplexer 215. In the first embodiment, a signal $A_i$ before encoding is a PAM4 signal, and the number of channels is 2.

The encoding unit 211 generates a signal $B_1$ and a signal $B_2$ indicating seven-value digital data having any one of seven values $\{0, 1, 2, 3, 4, 5, 6\}$ by executing encoding represented by Equation (4) on the signal $A_1$ and the signal $A_2$ indicating four-value digital data having any one of four values of $\{0, 1, 2, 3\}$. The DA converter 212-$i$ ($i=1, 2$) converts the digital data signal $B_i$ into an analog electrical signal and outputs a signal $B_i$ converted into the analog electrical signal to the intensity modulator 214-$i$. The light source 213-$i$ ($i=1, 2$) outputs light having a wavelength of an $i^{th}$ channel. The intensity modulator 214-$i$ ($i=1, 2$) performs optical amplitude modulation on the light input from the light source 213-$i$ with the signal $B_i$ converted into the analog electrical signal and converts it into an optical signal of the $i^{th}$ channel. The wavelength multiplexer 215 transmits a wavelength-multiplexed signal obtained by performing wavelength multiplexing on the signal $B_1$ that is the optical signal of the first channel input from the intensity modulator 214-1 and the signal $B_2$ that is the optical signal of the second channel input from the intensity modulator 214-2 to the optical fiber transmission path.

Figure 3:
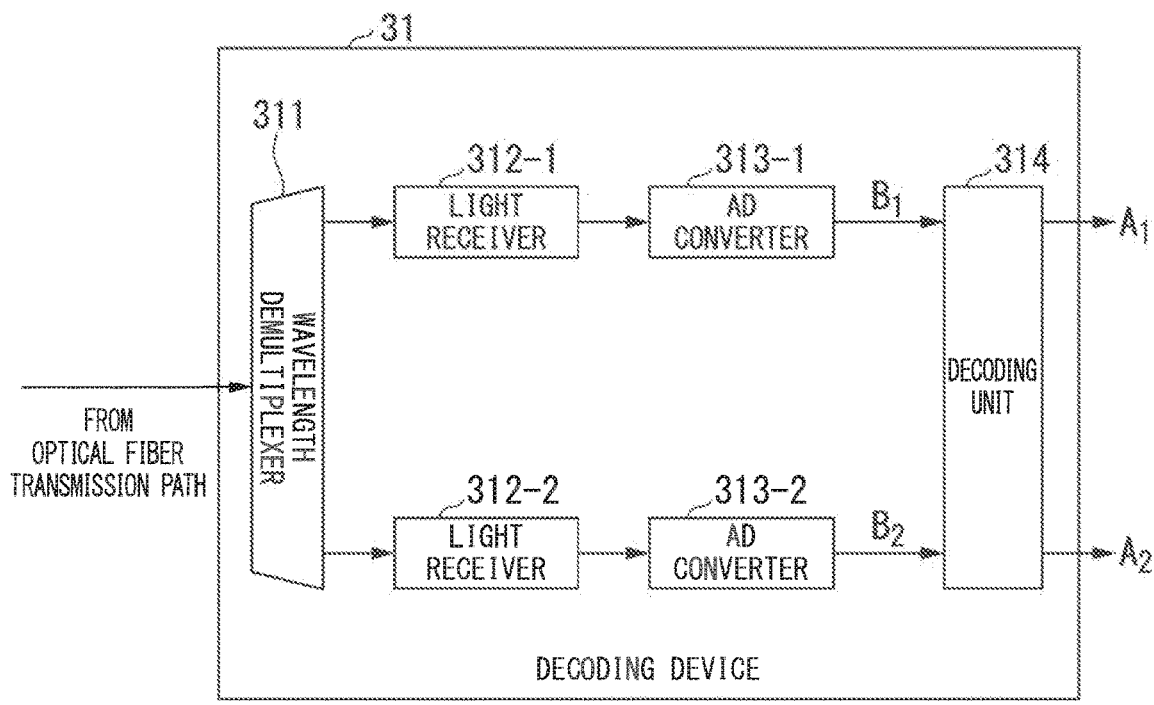
FIG. 3 is a diagram showing a configuration of a decoding device of the optical transmission system according to the first embodiment.

FIG. 3 is a diagram showing a configuration of the decoding device 31 of the optical transmission system according to the first embodiment. The decoding device 31 includes a wavelength demultiplexer 311, light receivers 312-1 and 312-2, analog-to-digital converters (AD converters) 313-1 and 313-2, and a decoding unit 314.

The wavelength demultiplexer 311 receives the wavelength-multiplexed signal output from the encoding device 21 shown in FIG. 2 and transmitted through the optical fiber transmission path. The wavelength demultiplexer 311 separates the signal for each channel by demultiplexing the received wavelength-multiplexed signal on the basis of wavelengths and outputs the optical signal of the $i^{th}$ channel ($i=1, 2$) to the light receiver 312-$i$. The light receiver 312-$i$ ($i=1, 2$) converts the optical signal of the $i^{th}$ channel into an analog electrical signal and outputs the analog electrical signal to the AD converter 313-$i$. The AD converter 313-$i$ ($i=1, 2$) converts the electrical signal input from the light receiver 312-$i$ into the signal $B_i$ indicating seven-value digital data having any one of seven values of $\{0, 1, 2, 3, 4, 5, 6\}$ and outputs the signal $B_i$ to the decoding unit 314. The decoding unit 314 inputs the signals $B_1$ and $B_2$ indicating seven-value digital data of the first and second channels. The decoding unit 314 performs decoding shown in the following Equation (8) on the signal $B_1$ and the signal $B_2$ to generate four-value digital data having any one of four values $\{0, 1, 2, 3\}$, thereby restoring the signal $A_1$ and the signal $A_2$ before encoding.

[Math. 8]

$$\begin{pmatrix} A_1 \\ A_2 \end{pmatrix} = \frac{1}{2}\begin{pmatrix} 1 & 1 \\ 1 & -1 \end{pmatrix}\begin{pmatrix} B_1 \\ B_2 \end{pmatrix} + \frac{3}{2}\begin{pmatrix} -1 \\ 1 \end{pmatrix} \qquad (8)$$

This equation is obtained by solving Equation (4) for the signals $A_i$ and substituting 3 to M (M=3).

A process of the decoding unit 314 represented by Equation (8) is executed using, for example, an adaptive digital filter. An internal configuration of the decoding unit 314 when the adaptive digital filter is used is shown in FIG. 4.

Figure 4:
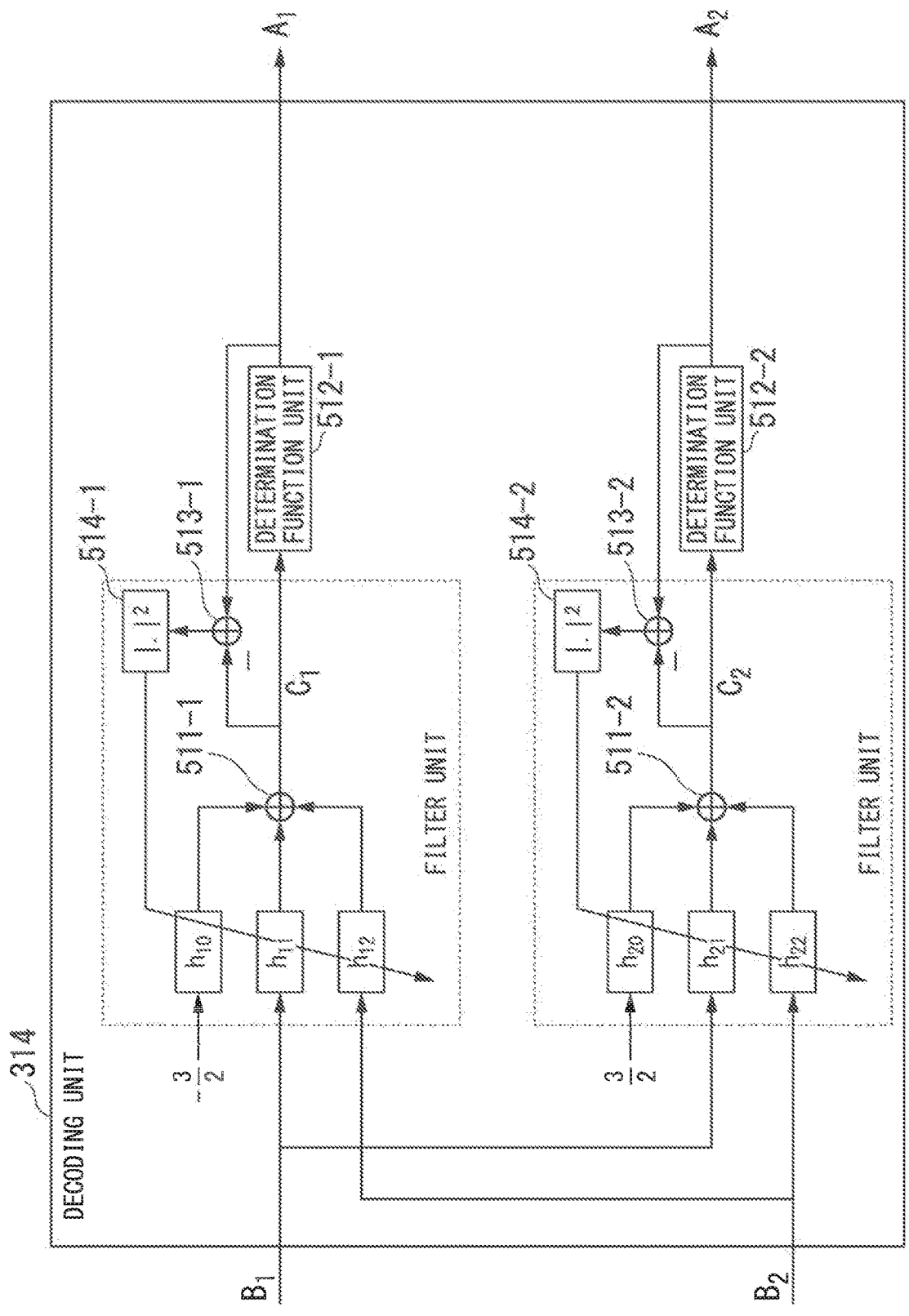
FIG. 4 is a diagram showing an internal configuration of a decoding unit according to the first embodiment.

FIG. 4 is a diagram showing the internal configuration of the decoding unit 314. The decoding unit 314 includes filters $h_{10}, h_{11}, h_{12}, h_{20}, h_{21}$ and $h_{22}$, addition units 511-1 and 511-2, determination function units 512-1 and 512-2, calculation units 513-1 and 513-2, and feedback units 514-1 and 514-2. The filters $h_{10}, h_{11}, h_{12}, h_{20}, h_{21}$ and $h_{22}$ are adaptive digital tilters.

In the decoding unit 314, the determination function unit 512-$i$ performs a threshold value determination on the digital data $C_i$ ($i=1, 2$) obtained by applying an adaptive digital filtering process to the signal $B_i$ ($i=1, 2$), thereby obtaining a signal $A_i$ ($i=1, 2$) indicating four-value digital data having any one of four values of $\{0, 1, 2, 3\}$. Assuming that the filters $h_{10}, h_{11}, h_{12}, h_{20}, h_{21}$ and $h_{22}$ in FIG. 4 are finite impulse response (FIR) filters having any number of taps, a relational equations shown in the following Equations (9) and (10) are obtained with respect to the digital data $C_i$ output from the addition unit 511-$i$ ($i=1, 2$).

[Math. 9]

$$C_1 = -\frac{3}{2}h_{10} + h_{11}B_1 + h_{12}B_2 \qquad (9)$$

[Math. 10]

$$C_2 = \frac{3}{2}h_{20} + h_{21}B_1 + h_{22}B_2 \qquad (10)$$

The present invention has a large difference from the conventional Walsh decoding in that an adaptive filtering process for a constant value is applied to the first terms of the right sides in Equations (9) and (10) and the adaptive filtering process is a required process when Walsh decoding is applied to an intensity-modulated signal.

As a method of updating tap coefficients through the feedback units 514-1 and 514-2, any method can be applied. For example, if a decision-directed least-mean-square (DD-LMS) method is used for updating the tap coefficients, an error function $E_1$ that is used for updating the taps of the filters $h_{10}$, $h_{11}$ and $h_{12}$ and an error function $E_2$ that is used for updating the taps of the filters $h_{20}$, $h_{21}$ and $h_{22}$ are defined as shown in the following Equations (11) and (12).

[Math. 11]
$$E_1 = \|A_1 - C_1\|^2 \quad (11)$$

[Math. 12]
$$E_2 = \|A_2 - C_2\|^2 \quad (12)$$

The above-described error function $E_i$ (i=1, 2) is calculated by the feedback unit 514-i on the basis of $A_i - C_i$ calculated by the calculation unit 513-i.

Assuming that an amount of update of the tap coefficient $h_{ij}$ in the filter $h_{ij}$ (i=1, 2 and j=0, 1, 2) is denoted by $\Delta h_{ij}$, amounts of update $\Delta h_{ij}$ calculated in the feedback units 514-1 and 514-2 are represented by the following Equations (13) to (15).

[Math. 13]
$$\Delta h_{10} = -\mu \frac{\partial E_1}{\partial h_{10}} = -3\mu(A_1 - C_1) \quad (13)$$

[Math. 14]
$$\Delta h_{20} = -\mu \frac{\partial E_2}{\partial h_{20}} = 3\mu(A_2 - C_2) \quad (14)$$

[Math. 15]
$$\Delta h_{ij} = -\mu \frac{\partial E_i}{\partial h_{ij}} = 2\mu(A_i - C_i)B_i \quad (i, j = 1, 2) \quad (15)$$

Here, $\mu$ is a step size parameter. The tap coefficient $h_{ij}$ in the filter $h_{ij}$ (i=1, 2 and j=0, 1, 2) is a value that adaptively changes and the decoding of Equation (8) is implemented according to an adaptive process. Therefore, an adaptive process with high convergence of the tap coefficients is enabled by setting an initial value of the tap coefficient $h_{ij}$ (i=1, 2 and j=0, 1, 2) as shown in the following Equations (16) and (17) in accordance with Equation (8).

[Math. 16]
$$\begin{pmatrix} h_{11} & h_{12} \\ h_{21} & h_{22} \end{pmatrix} = \frac{1}{2} H_2 \quad (16)$$

[Math. 17]
$$\begin{pmatrix} h_{10} \\ h_{20} \end{pmatrix} = \begin{pmatrix} 1 \\ 1 \end{pmatrix} \quad (17)$$

Figure 5:
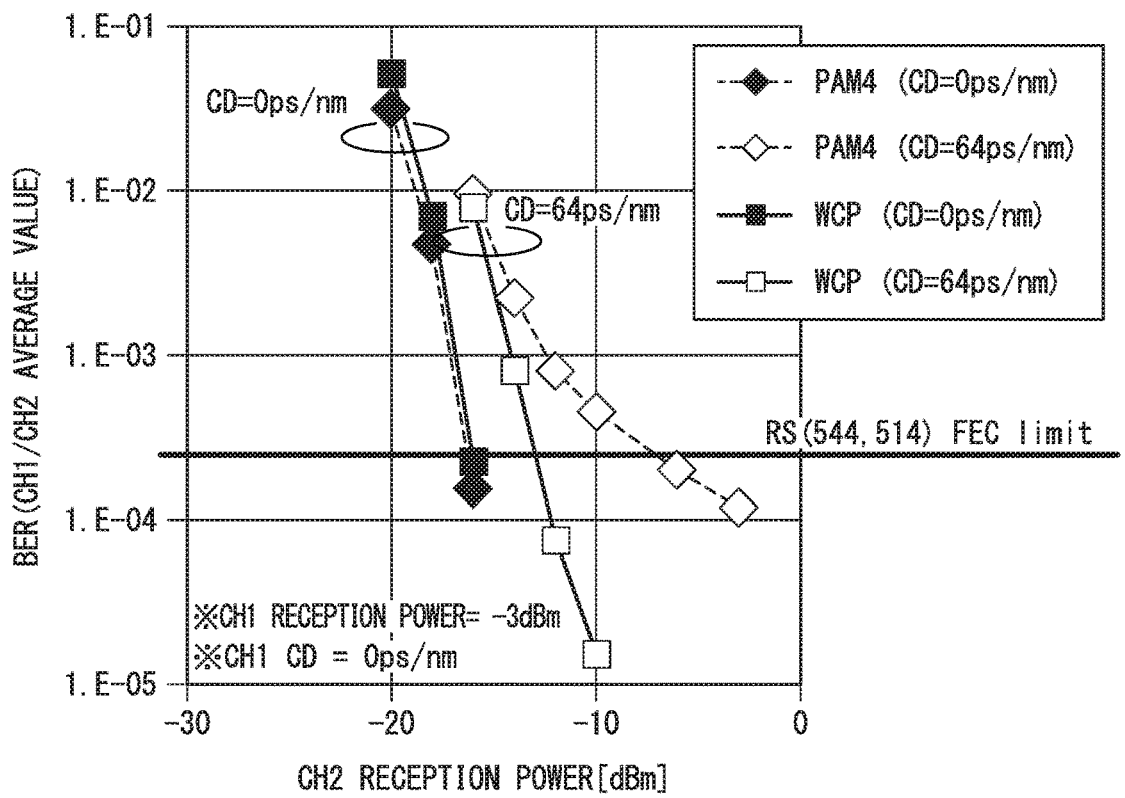
FIG. 5 is a diagram showing signal quality of the optical transmission system according to the first embodiment.

FIG. 5 is a diagram showing the signal quality of the optical transmission system according to the first embodiment. FIG. 5 is a diagram showing a relationship between reception power of the second channel (CH2) and an average value between a bit error rate (BER) of the first channel (CH1) and a BER of the second channel (CH2) when the first embodiment is applied to PAM4 signals of two channels. FIG. 5 is based on results of numerical simulation. Here, the average value of the BERs of the channels is used as an index representing the signal quality of the entire system.

Figure 6:
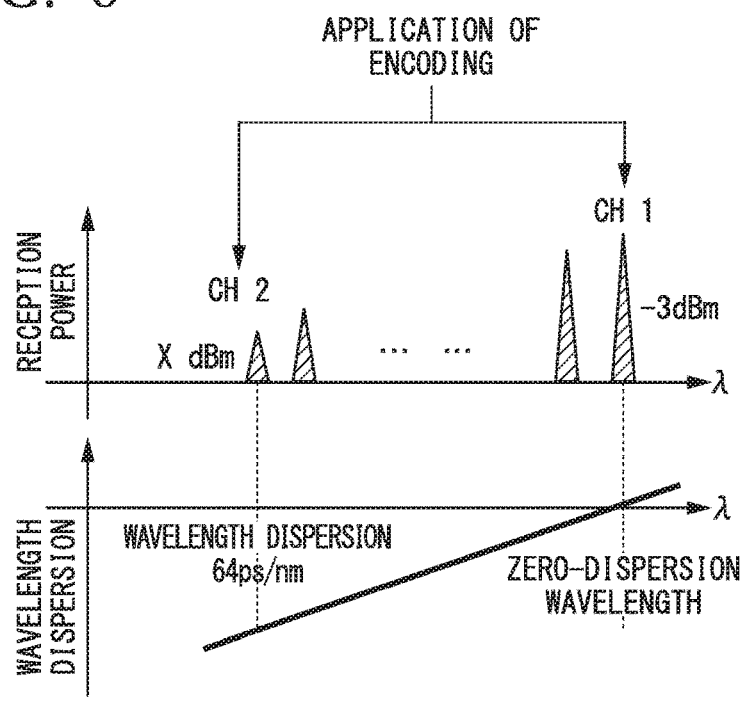
FIG. 6 is a diagram showing reception power and wavelength dispersion of each channel in a simulation in which the signal quality shown in FIG. 5 is obtained.

FIG. 6 is a diagram showing reception power and wavelength dispersion of each channel used in the simulation of FIG. 5. As shown in FIG. 6, here, each channel is a PAM4 signal for implementing a data transmission of 112 Gbps and the number of channels is 10. A channel with a longest wavelength is a first channel (CH1) and the wavelength of the first channel is equal to a zero-dispersion wavelength of a transmission fiber. The reception power of the first channel is −3 dBm. A channel with a shortest wavelength is a second channel (CH2) and a cumulative wavelength dispersion (CD) value in the second channel is 0 ps/nm or 64 ps/nm. The cumulative wavelength dispersion value of 64 ps/nm corresponds to a cumulative wavelength dispersion value when transmission is performed through a single-mode fiber of about 10 km. The encoding described in the first embodiment is applied to the PAM4 signal of the first channel and the PAM4 signal of the second channel.

FIG. 5 described above shows average BERs when the reception power of the second channel has been changed when the encoding of the first embodiment is applied to the first channel (CH1) and the second channel (CH2) shown in FIG. 6 and when the encoding of the first embodiment is not applied thereto. Here, in FIG. 5, PAM4 indicates a case in which Walsh encoding is not applied and WCP indicates a case in which encoding of the first embodiment is applied. As shown in FIG. 5, if the cumulative dispersion value of the second channel is 0 ps/nm, the signal quality is the same regardless of whether or not encoding is applied. On the other hand, paying attention to a case in which the cumulative dispersion value of the second channel is 64 ps/nm, when encoding of the present embodiment is not applied, i.e., when a conventional PAM4 signal is transmitted, it is not possible to implement a BER less than or equal to an error correction limit (a forward error correction (FEC) limit) if the reception power of the second channel is not greater than or equal to −6 dBm. However, it is possible to implement a BER less than or equal to the FEC limit even if the reception power of the second channel is −12 dBm by applying the encoding of the present embodiment. This means that a characteristic improvement of 6 dB or more was obtained in terms of reception power by applying the encoding of the present embodiment. Here, the number of taps of the adaptive digital filter is set to 31.

Second Embodiment

A second embodiment is similar to the first embodiment in that Walsh encoding is performed on PAM4 signals of two channels, but a filter configuration of a decoding unit is different. That is, the second embodiment is characterized in that the number of adaptive digital filters constituting a decoding unit is reduced by improving the decoding unit of the first embodiment. The encoded PAM4 signal is decoded according to Equation (8), but Equation (8) can be modified as shown in the following Equation (18).

[Math. 18]

$$\begin{pmatrix} A_1 \\ A_2 \end{pmatrix} = \frac{1}{2} \begin{pmatrix} 1 & 1 \\ 1 & -1 \end{pmatrix} \begin{pmatrix} B_1 \\ B_2 - 3 \end{pmatrix} \quad (18)$$

It is possible to perform decoding by executing the process represented by Equation (18) with an adaptive digital filter.

Figure 7:
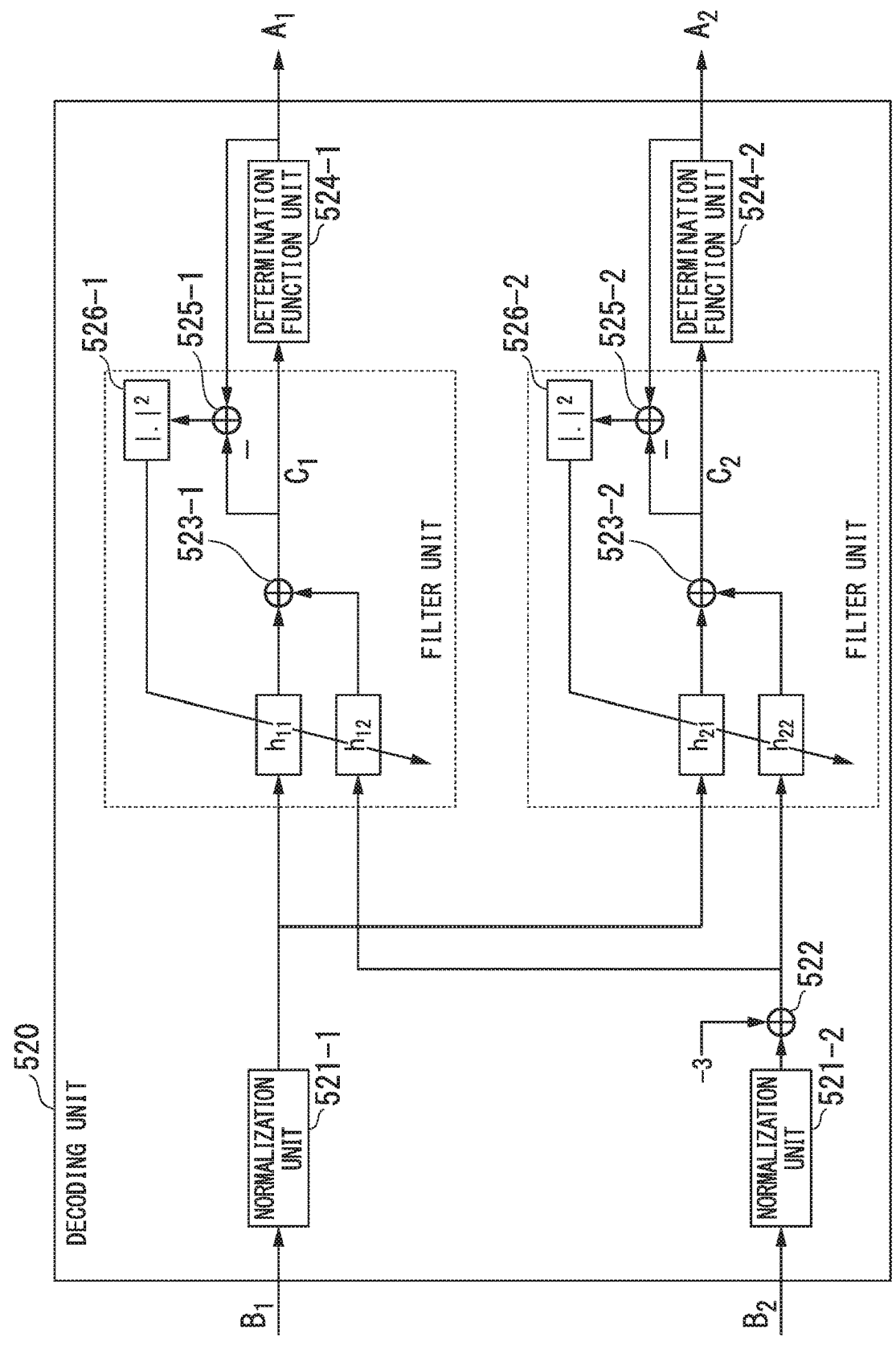
FIG. 7 is a diagram showing an internal configuration of a decoding unit according to a second embodiment.

FIG. 7 is a diagram showing an internal configuration of a decoding unit 520 according to the second embodiment. The decoding unit 520 is used in place of the decoding unit 314 of the first embodiment shown in FIG. 3. The decoding unit 520 includes normalization units 521-1 and 521-2, an addition unit 522, filters $h_{11}$, $h_{12}$, $h_{21}$, and $h_{22}$, addition units 523-1 and 523-2, determination function units 524-1 and 524-2, calculation units 525-1 and 525-2, and feedback units 526-1 and 526-2. The filters $h_{11}$, $h_{12}$, $h_{21}$ and $h_{22}$ are adaptive digital filters.

The normalization unit 521-$i$ ($i$=1, 2) of the second embodiment normalizes the received signal $B_i$ so that an average value of the received signal $B_i$ becomes 3. Normalized digital data is newly set to $B_i$ ($i$=1, 2) and the addition unit 522 adds −3 to a received signal $B_2$. The determination function unit 524-$i$ makes a threshold value determination on digital data $C_i$ ($i$=1, 2) obtained by applying the adaptive digital filtering process, thereby obtaining a signal $A_i$ ($i$=1, 2) indicating four-value digital data having any one of four values of $\{0, 1, 2, 3\}$. Assuming that the filters $h_{11}$, $h_{12}$, $h_{21}$ and $h_{22}$ in FIG. 7 are FIR filters with any number of taps, a relational equation shown in the following Equations (19) and (20) is obtained for digital data $C_i$ output from the addition unit 523-$i$ ($i$=1, 2).

[Math. 19]

$$C_1 = h_{11}B_1 + h_{12}(B_2 - 3) \quad (19)$$

[Math. 20]

$$C_2 = h_{21}B_1 + h_{22}(B_2 - 3) \quad (20)$$

As a method of updating tap coefficients through the feedback units 526-1 and 526-2, any method can be applied. For example, if a decision-directed least-mean-square (DD-LMS) method is used for updating the tap coefficients, an error function $E_1$ that is used for updating the tap coefficients $h_{11}$ and $h_{12}$ and an error function $E_2$ that is used for updating the tap coefficients $h_{21}$ and $h_{22}$ are defined as shown in the following Equations (21) and (22).

[Math. 21]

$$E_1 = \|A_1 - C_1\|^2 \quad (21)$$

[Math. 22]

$$E_2 = \|A_2 - C_2\|^2 \quad (22)$$

The above-described error function $E_i$ ($i$=1, 2) is calculated by the feedback unit 526-$i$ on the basis of $A_i - C_i$ calculated by the calculation unit 525-$i$.

Assuming that an amount of update of the tap coefficient $h_{ij}$ in the filter $h_{ij}$ ($i$, $j$=1, 2) is denoted by $\Delta h_{ij}$, amounts of update $\Delta h_{ij}$ calculated by the feedback units 526-1 and 526-2 are represented by Equations (23) and (24).

[Math. 23]

$$\Delta h_{i1} = -\mu \frac{\partial E_i}{\partial h_{i1}} = 2\mu(A_i - C_i)B_1, \quad (i=1, 2) \quad (23)$$

[Math. 24]

$$\Delta h_{i2} = -\mu \frac{\partial E_i}{\partial h_{i2}} = 2\mu(A_i - C_i)(B_2 - 3), \quad (i=1, 2) \quad (24)$$

Here, $\mu$ is a step size parameter. The tap coefficient $h_{ij}$ in the filter $h_{ij}$ ($i$, $j$=1, 2) is a value that adaptively changes and the decoding of Equation (18) is implemented according to an adaptive process. Therefore, an adaptive process with high convergence of the tap coefficients is enabled by setting an initial value of the tap coefficient $h_{ij}$ ($i$, $j$=1, 2) as shown in the following Equation (25) in accordance with Equation (18).

[Math. 25]

$$\begin{pmatrix} h_{11} & h_{12} \\ h_{21} & h_{22} \end{pmatrix} = \frac{1}{2} H_2 \quad (25)$$

There are six adaptive digital filters $h_{10}$, $h_{11}$, $h_{12}$, $h_{20}$, $h_{21}$ and $h_{22}$ in the first embodiment, whereas the number of adaptive digital filters is reduced to four of $h_{11}$, $h_{12}$, $h_{21}$ and $h_{22}$ in the second embodiment. By reducing the number of adaptive digital filters, the scale of the digital circuit of the decoding unit 520 is reduced.

Third Embodiment

In the third embodiment, Walsh encoding is performed on (M+1)-value PAM signals of N channels.

Figure 8:
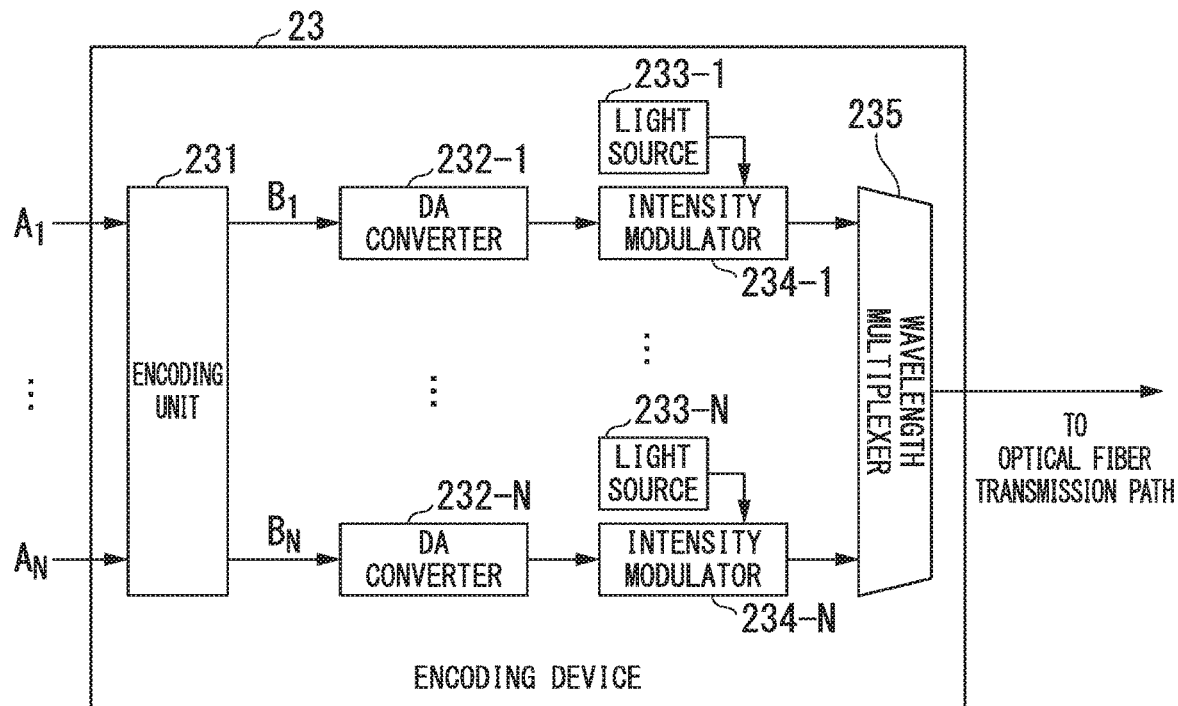
FIG. 8 is a diagram showing a configuration of an encoding device of an optical transmission system according to a third embodiment.

FIG. 8 is a diagram showing a configuration of an encoding device 23 of an optical transmission system according to the third embodiment. The encoding device 23 includes an encoding unit 231, digital-to-analog converters (DA converters) 232-1 to 232-N, light sources 233-1 to 233-N, intensity modulators 234-1 to 234-N and a wavelength multiplexer 235. In the third embodiment, a signal $A_i$ ($i$=1, 2, . . . , N) before encoding is an (M+1)-value PAM signal and the number of channels is N.

The encoding unit 231 generates signals $B_1$ to $B_N$ representing (NM+1)-value digital data having any one value of (NM+1) values of $\{0, 1, \ldots, NM\}$ by executing encoding represented by Equation (5) on signals $A_1$ to $A_N$ representing (M+1)-value digital data having any one of (M+1) values of $\{0, 1, \ldots, M\}$. The DA converter 232-$i$ ($i$=1, 2, . . . , N) converts a digital data signal $B_i$ into an analog electrical signal and outputs a signal $B_i$ converted into the analog electrical signal to the intensity modulator 234-$i$. The light source 233-$i$ ($i$=1, 2, . . . , N) outputs light having a wavelength of an $i^{th}$ channel. The intensity modulator 234-$i$ ($i$=1, 2, . . . , N) performs optical amplitude modulation on the light input from the light source 233-$i$ according to the signal $B_i$ converted into the analog electrical signal to generate an optical signal of the $i^{th}$ channel. The wavelength multiplexer 235 wavelength-multiplexes signals $B_1$ to $B_N$ that are optical signals of first to $N^{th}$ channels input from the intensity modulators 234-1 to 234-N and transmits a wavelength-multiplexed signal generated by wavelength multiplexing to an optical fiber transmission path.

Figure 9:
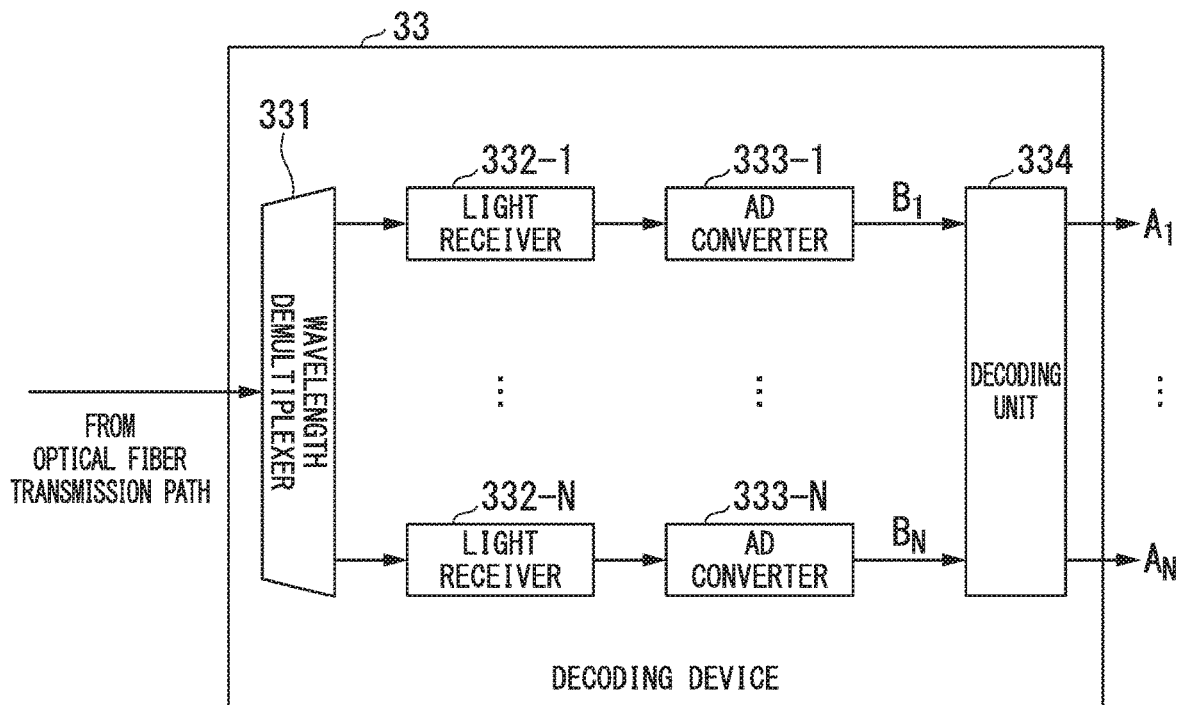
FIG. 9 is a diagram showing a configuration of a decoding device of an optical transmission system according to the third embodiment.

FIG. 9 is a diagram showing the configuration of the decoding device 33 of the optical transmission system according to the third embodiment. The decoding device 33 includes a wavelength demultiplexer 331, light receivers 332-1 to 332-N, analog-to-digital converters (AD converters) 333-1 to 333-N and a decoding unit 334.

The wavelength demultiplexer 331 receives a wavelength-multiplexed signal output from the encoding device 23 shown in FIG. 8 and transmitted through the optical fiber transmission path. The wavelength demultiplexer 311 separates the signal for each channel by demultiplexing the received wavelength-multiplexed signal on the basis of wavelengths and outputs the optical signal of the $i^{th}$ channel (i=1, 2, ..., N) to the light receiver 332-$i$. The light receiver 332-$i$ (i=1, 2, ..., N) converts the optical signal of the $i^{th}$ channel into an analog electrical signal and outputs the analog electrical signal to the AD converter 333-$i$. The AD converter 333-$i$ (i=1, 2, ..., N) converts the analog electrical signal input from the light receiver 332-$i$ into the signal $B_i$ indicating (NM+1)-value digital data having any one value of (0, 1, ..., NM) and outputs the signal $B_i$ to the decoding unit 334. The decoding unit 334 inputs the signals $B_1$ and $B_N$ indicating (NM+1)-value digital data of the first to $N^{th}$ channels. The decoding unit 334 performs decoding shown in the following Equation (26) on the signals $B_1$ to $B_N$ to generate (M+1)-value digital data having any one value of {0, 1, ..., M}, thereby restoring the signal $A_i$ (i=1, 2, ..., N) before encoding.

[Math. 26]

$$\begin{pmatrix} A_1 \\ A_2 \\ \vdots \\ A_N \end{pmatrix} = \frac{H_N}{N} \begin{pmatrix} B_1 \\ B_2 \\ \vdots \\ B_N \end{pmatrix} + \frac{M}{2} \begin{pmatrix} -(N-1) \\ 1 \\ \vdots \\ 1 \end{pmatrix} \quad (26)$$

This equation is obtained by solving Equation (5) for the signal $A_i$.

A process of the decoding unit 334 represented by Equation (26) is executed using, for example, an adaptive digital filter. An internal configuration of the decoding unit 334 when an adaptive digital filter is used is shown in FIG. 10.

Figure 10:
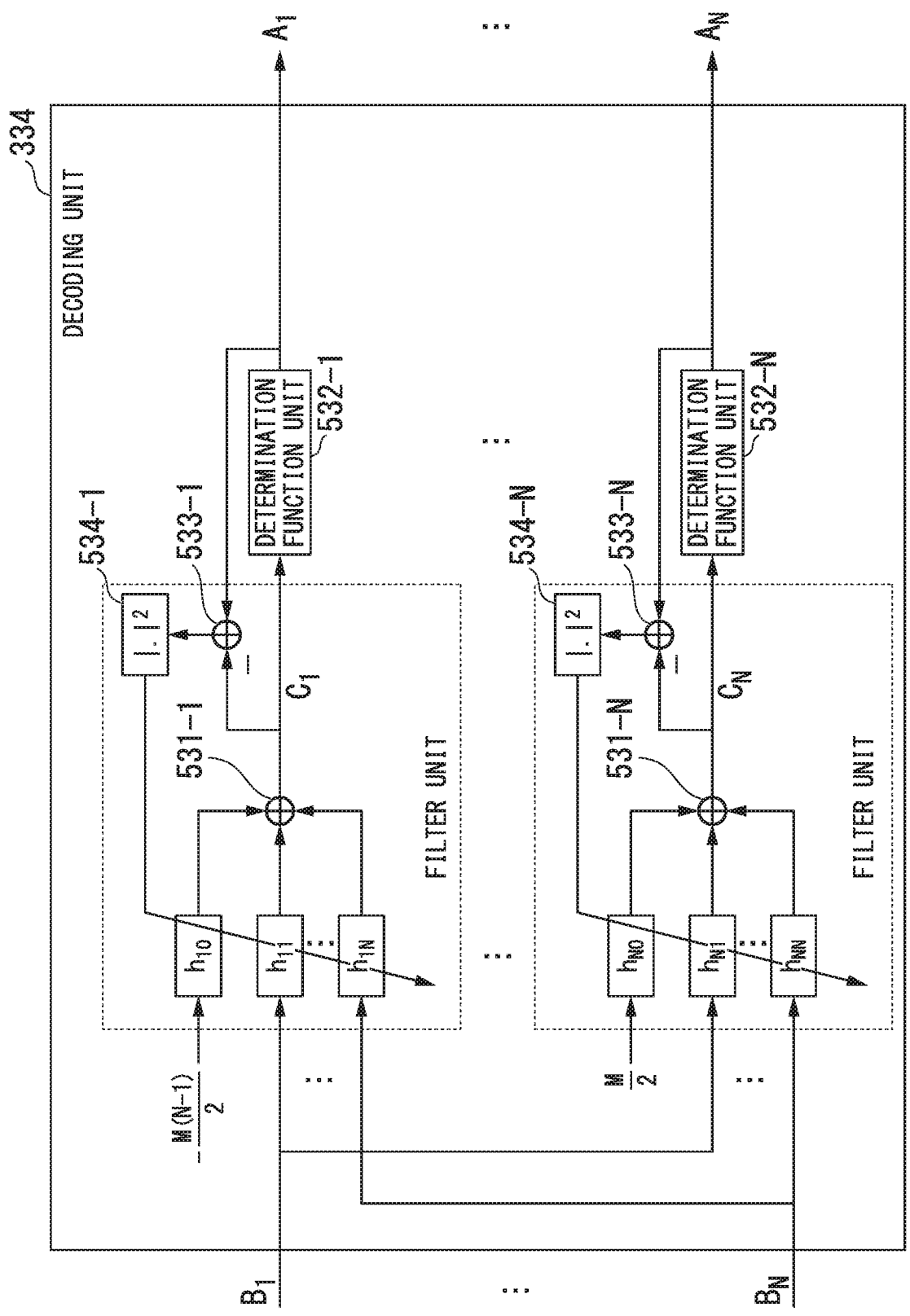
FIG. 10 is a diagram showing an internal configuration of a decoding unit according to the third embodiment.

FIG. 10 is a diagram showing an internal configuration of the decoding unit 334. The decoding unit 334 includes filters $h_{10}$ to $h_{1N}$, ..., $h_{N0}$ to $h_{NN}$, addition units 531-1 to 531-N, determination function units 532-1 to 532-N, calculation units 533-1 to 533-N, and feedback units 534-1 to 534-N. The filters $h_{10}$ to $h_{1N}$, ..., $h_{N0}$ to $h_{NN}$ are adaptive digital filters.

In the decoding unit 334, the determination function unit 532-$i$ obtains a signal $A_i$ (i=1, 2, ..., N) indicating (M+1)-value digital data having any one value of {0, 1, ..., M} by making a threshold value determination on the digital data $C_i$ (i=1, 2, ..., N) obtained by applying the adaptive digital filtering process to the signal $B_i$ (i=1, 2, ..., N). Assuming that the filter $h_{ij}$ (i=1, 2, ..., N and j=0, 1, ..., N) in FIG. 10 is an FIR filter having any number of taps, a relational equation shown in the following Equations (27) and (28) is obtained with respect to digital data $C_i$ output from the addition unit 531-$i$ (i=1, 2, ..., N).

[Math. 27]

$$C_1 = -\frac{M(N-1)}{2} h_{10} + \sum_{k=1}^{N} h_{1k} B_k \quad (27)$$

[Math. 28]

$$C_i = \frac{M}{2} h_{i0} \sum_{k=1}^{N} h_{ik} B_k, \quad (i = 2, \ldots, N) \quad (28)$$

The present invention has a large difference from the conventional Walsh decoding in that an adaptive filtering process for a constant value is applied to the first terms of the right sides in Equations (27) and (28) and the adaptive filtering process is a required process when Walsh decoding is applied to an intensity-modulated signal.

As a method of updating tap coefficients through the feedback units 534-1 to 534-N, any method can be applied. For example, if a decision-directed least-mean-square (DD-LMS) method is used for updating the tap coefficients, an error function $E_i$ that is used for updating the tap of the filter $h_{ij}$ (i=1, 2, ..., N and j=0, 1, ..., N) is defined as shown in the following Equation (29).

[Math. 29]

$$E_i = \|A_i - C_i\|^2 \quad (29)$$

The above-described error function $E_i$ (i=1, 2, ..., N) is calculated by the feedback unit 534-$i$ on the basis of $A_i$–$C_i$ calculated by the calculation unit 533-$i$.

Assuming that an amount of update of the tap coefficient $h_{ij}$ in the filter $h_{ij}$ (i=1, 2, ..., N and j=0, 1, ..., N) is denoted by $\Delta h_{ij}$, amounts of update $\Delta h_{ij}$ calculated in the feedback units 534-1 to 534-N are represented by the following Equations (30) to (32).

[Math. 30]

$$\Delta h_{10} = -\mu \frac{\partial E_1}{\partial h_{10}} = -\mu M(N-1)(A_1 - C_1) \quad (30)$$

[Math. 31]

$$\Delta h_{i0} = -\mu \frac{\partial E_i}{\partial h_{i0}} = -\mu M(A_i - C_i), \quad (i = 2, \ldots, N) \quad (31)$$

[Math. 32]

$$\Delta h_{ij} = -\mu \frac{\partial E_i}{\partial h_{ij}} = 2\mu(A_i - C_i)B_i \quad (i, j = 1, 2) \quad (32)$$

Here, $\mu$ is a step size parameter. The tap coefficient $h_{ij}$ in the filter $h_{ij}$ (i=1, 2, ..., N and j=0, 1, ..., N) is a value that adaptively changes and the decoding of Equation (26) is implemented according to an adaptive process. Therefore, an adaptive process with high convergence of the tap coefficients is enabled by setting an initial value of the tap coefficient $h_{ij}$ (i=1, 2, ..., N and j=0, 1, ..., N) as shown in the following Equations (33) and (34) in accordance with Equation (26).

[Math. 33]

$$\begin{pmatrix} h_{11} & \cdots & h_{1N} \\ \vdots & \ddots & \vdots \\ h_{N1} & \cdots & h_{NN} \end{pmatrix} = \frac{1}{N} H_N \quad (33)$$

[Math. 34]

$$\begin{pmatrix} h_{10} \\ h_{20} \\ \vdots \\ h_{N0} \end{pmatrix} = \begin{pmatrix} 1 \\ 1 \\ \vdots \\ 1 \end{pmatrix} \quad (34)$$

Fourth Embodiment

A fourth embodiment is similar to the third embodiment in that Walsh encoding is performed on (M+1)-value PAM signals of N channels, but a filter configuration of a decoding unit is different. That is, the fourth embodiment is characterized in that the number of adaptive digital filters constituting the decoding unit is reduced by improving the decoding unit of the third embodiment. An encoded (M+1)-value PAM signal is decoded according to Equation (26), but Equation (26) can be modified as shown in the following Equation (35).

[Math. 35]

$$\begin{pmatrix} A_1 \\ A_2 \\ \vdots \\ A_N \end{pmatrix} = \frac{H_N}{N} \begin{pmatrix} B_1 \\ B_2 - NM/2 \\ \vdots \\ B_N - NM/2 \end{pmatrix} \quad (35)$$

It is possible to perform decoding by executing the process represented by Equation (35) with an adaptive digital filter.

Figure 11:
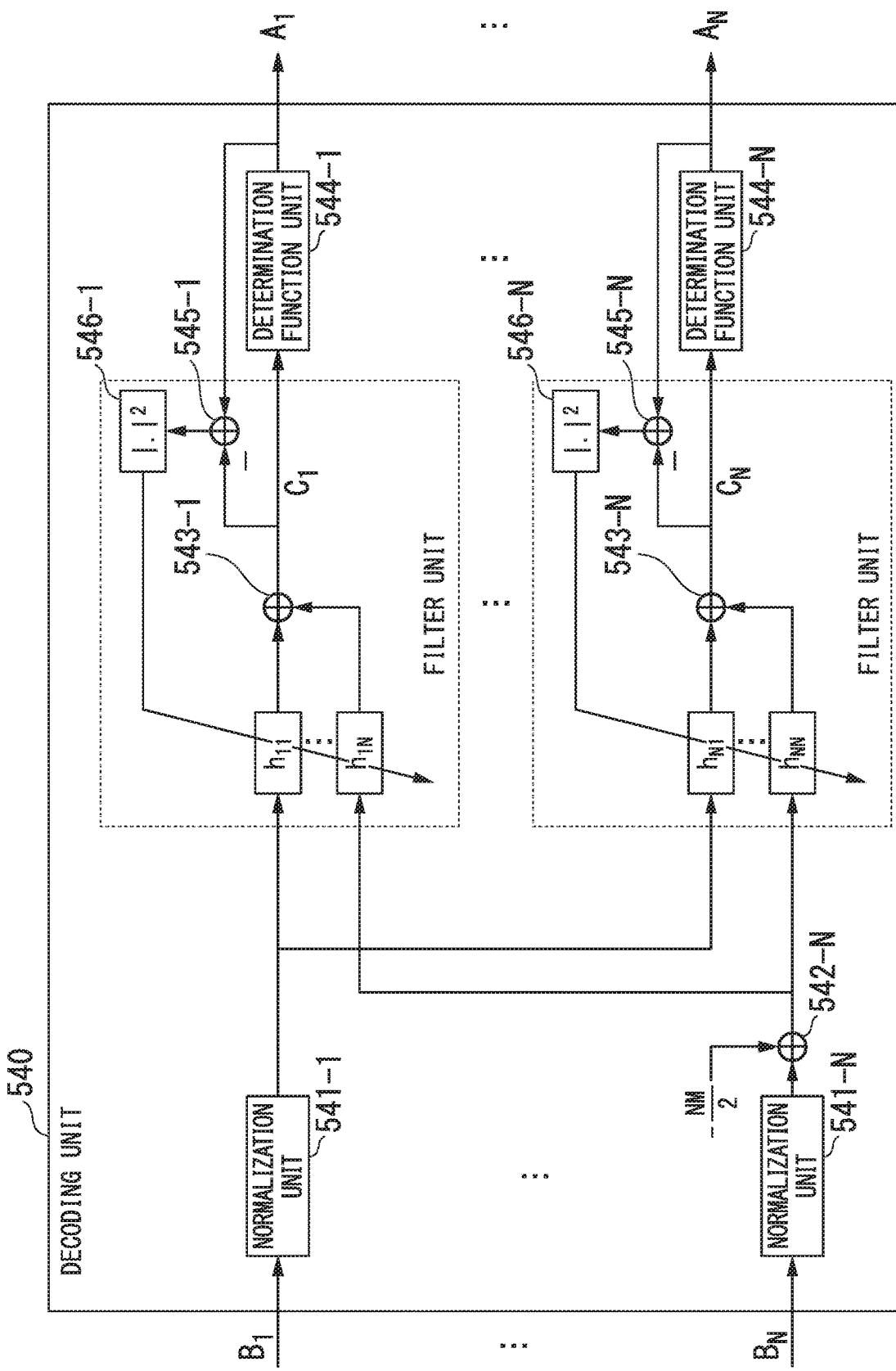
FIG. 11 is a diagram showing an internal configuration of a decoding unit according to a fourth embodiment.

FIG. 11 is a diagram showing an internal configuration of a decoding unit 540 according to the fourth embodiment. The decoding unit 540 is used in place of the decoding unit 334 of the third embodiment shown in FIG. 10. The decoding unit 540 includes normalization units 541-1 to 541-N, addition units 542-2 to 542-N, filters $h_{11}$ to $h_{1N}$, ..., $h_{N1}$ to $h_{NN}$, addition units 543-1 to 543-N, determination function units 544-1 to 544-N, calculation units 545-1 to 545-N, and feedback units 546-1 to 546-N. The filters $h_{11}$ to $h_{1N}$, ..., $h_{N1}$ to $h_{NN}$ are adaptive digital filters.

The normalization unit 541-$i$ ($i=1, \ldots, N$) of the present embodiment normalizes the received signal $B_i$ so that an average value of the received signal $B_i$ becomes M. Normalized digital data is newly set to a signal $B_i$ ($i=1, \ldots, N$) and the addition unit 542-$i$ ($i=2, \ldots, N$) adds (−NM/2) to the received signal $B_i$. The determination function unit 544-$i$ makes a threshold value determination on digital data $C_i$ ($i=1, \ldots, N$) obtained by applying the adaptive digital filtering process, thereby obtaining a signal $A_i$ ($i=1, \ldots, N$) indicating (M+1)-value digital data having any one value of $\{0, 1, \ldots, M\}$. Assuming that the filter $h_{ij}$ ($i, j=1, \ldots, N$) in FIG. 11 is an FIR filter having any number of taps, a relational equation shown in the following Equation (36) is obtained with respect to digital data $C_i$ output from the addition unit 543-$i$ ($i=1, \ldots, N$).

[Math. 36]

$$C_i = h_{i1} B_1 + \sum_{k=2}^{N} h_{ik}\left(B_k - \frac{NM}{2}\right), \quad (i = 1, \ldots N) \quad (36)$$

As a method of updating tap coefficients through the feedback units 546-1 to 546-N, any method can be applied. For example, if a decision-directed least-mean-square (DD-LMS) method is used for updating the tap coefficients, an error function $E_i$ that is used for updating the tap coefficient $h_{ij}$ ($i, j=1, \ldots, N$) is defined as shown in the following Equation (37).

[Math. 37]

$$E_i = \|A_i - C_i\|^2 \quad (37)$$

The error function $E_i$ ($i=1, \ldots, N$) is calculated by the feedback unit 546-$i$ on the basis of $A_i - C_i$ calculated by the calculation unit 545-$i$.

Assuming that an amount of update of the tap coefficient in the filter $h_{ij}$ ($i, j=1, \ldots, N$) is denoted by $\Delta h_{ij}$, amounts of update $\Delta h_{ij}$ calculated by the feedback unit 546-$i$ are represented by the following Equations (38) and (39).

[Math. 38]

$$\Delta h_{i1} = -\mu \frac{\partial E_i}{\partial h_{i1}} = 2\mu(A_i - C_i)B_1, \quad (i = 1, \ldots, N) \quad (38)$$

[Math. 39]

$$\Delta h_{ij} = -\mu \frac{\partial E_i}{\partial h_{ij}} = 2\mu(A_i - C_i)\left(B_j - \frac{NM}{2}\right), \quad (39)$$
$$(i = 1, \ldots, N, \quad j = 2, \ldots, N)$$

Here, $\mu$ is a step size parameter. The tap coefficient $h_{ij}$ in the filter $h_{ij}$ ($i, j=1, \ldots, N$) is a value that adaptively changes and the decoding of Equation (35) is implemented according to an adaptive process. Therefore, an adaptive process with high convergence of the tap coefficients is enabled by setting an initial value of the tap coefficient $h_{ij}$ ($i, j=1, \ldots, N$) as shown in the following Equation (40) in accordance with Equation (35).

[Math. 40]

$$\begin{pmatrix} h_{11} & \cdots & h_{1N} \\ \vdots & \ddots & \vdots \\ h_{N1} & \cdots & h_{NN} \end{pmatrix} = \frac{1}{N} H_N \quad (40)$$

There are N(N+1) adaptive digital filter $h_{ij}$ ($i=1, \ldots, N$ and $j=0, \ldots, N$) in the third embodiment, whereas the fourth embodiment is characterized in that the number of adaptive digital filters is reduced to $N^2$. By reducing the number of adaptive digital filters, the scale of the digital circuit of the decoding unit 540 is reduced.

Fifth Embodiment

In a fifth embodiment, a method of selecting a channel pair for performing encoding from N channels will be described.

Figure 12:
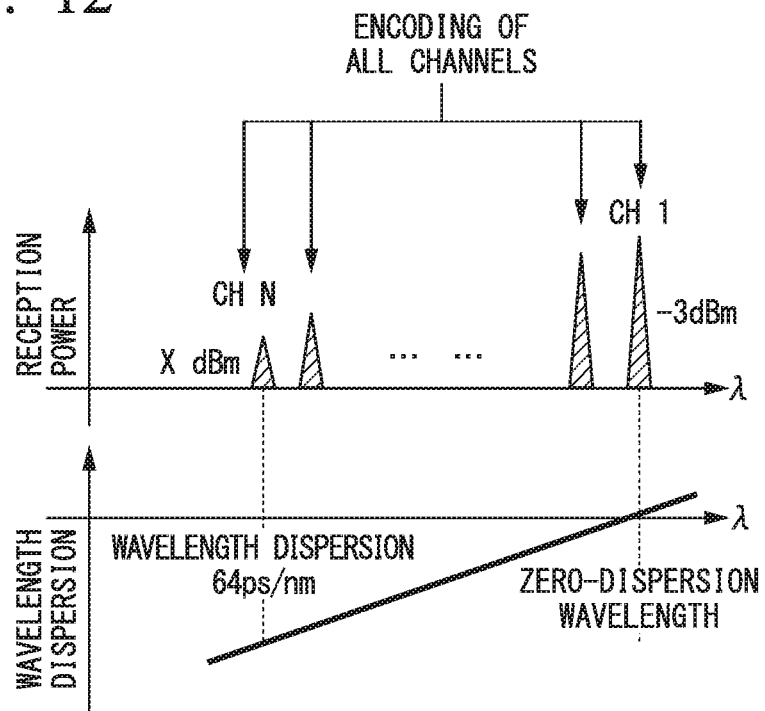
FIG. 12 is a diagram showing a case in which encoding is applied to all N channels.

FIG. 12 is a diagram showing a case in which encoding is applied to all N channels. In the third embodiment and the fourth embodiment, the encoding is applied to (M+1)-value PAM signal of N channels, as shown in FIG. 12. However, even if an optical transmission system includes N channels and even if encoding according to the third embodiment or the fourth embodiment is not necessarily applied to all channels, an effect of improvement of signal quality can be obtained.

The first to fourth embodiments have an effect of averaging signal qualities of a plurality of channels. Therefore, if the encoding is applied to all N channels, a highest signal quality improvement effect can be obtained. However, if the encoding is applied to all N channels, the number of adaptive digital filters necessary for decoding becomes N(N+1) in the third embodiment and becomes $N^2$ in the fourth embodiment. Because the number of adaptive digital filters increases in the order of a square of the number of channels, it is difficult to implement a digital signal processing circuit for implementing decoding in an optical transmission system with a large number of channels N from the viewpoint of a circuit scale.

Figure 13:
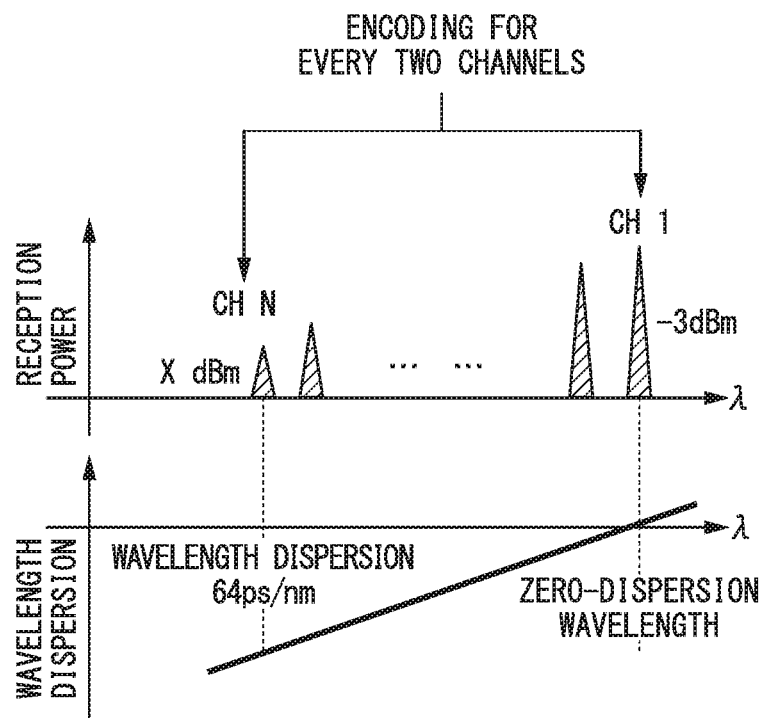
FIG. 13 is a diagram showing selection of a channel of an encoding target according to a fifth embodiment.

Therefore, in the fifth embodiment, as shown in FIG. 13, any two channels are selected from (M+1)-value PAM signals of N channels and encoding is performed on the two channels.

FIG. 13 is a diagram showing selection of a channel to be encoded in the fifth embodiment. In this manner, by applying encoding to any two channels selected from (M+1)-value PAM signals of N channels, it is possible to reduce the number of adaptive digital filters required for decoding. An amount of signal quality improvement effect obtained by encoding differs according to a method of selecting any two channels. Focusing on the fact that the first to fourth embodiments have the effect of averaging signal qualities of a plurality of channels, it is possible to maximize the signal quality of the entire optical transmission system by selecting two channels in the following procedure.

First, channel numbers are assigned to (M+1)-value PAM signals of N channels in descending order of signal quality. That is, channel numbers are assigned to a channel with a highest signal quality as a first channel and a channel with a second highest signal quality as a second channel and a channel number is assigned to each channel so that a channel with a lowest signal quality is set as an $N^{th}$ channel. For these channels to which the channel numbers are assigned in descending order of signal quality, the first channel and the $N^{th}$ channel are selected as a pair, the second channel and an $(N-1)^{th}$ channel are selected as a pair, and an $i^{th}$ channel and an $(N-i+1)^{th}$ channel are similarly selected as a pair hereinafter. Next, encoding is separately applied to each pair. If N is an odd number, an $((N+1)/2)^{th}$ channel is transmitted as it is, i.e., as an (M+1)-value PAM signal. As an index indicating the signal quality, as shown in FIG. 13, the reception power of each channel may be used or a bit error rate or a wavelength dispersion value of each channel may be used.

Figure 14:
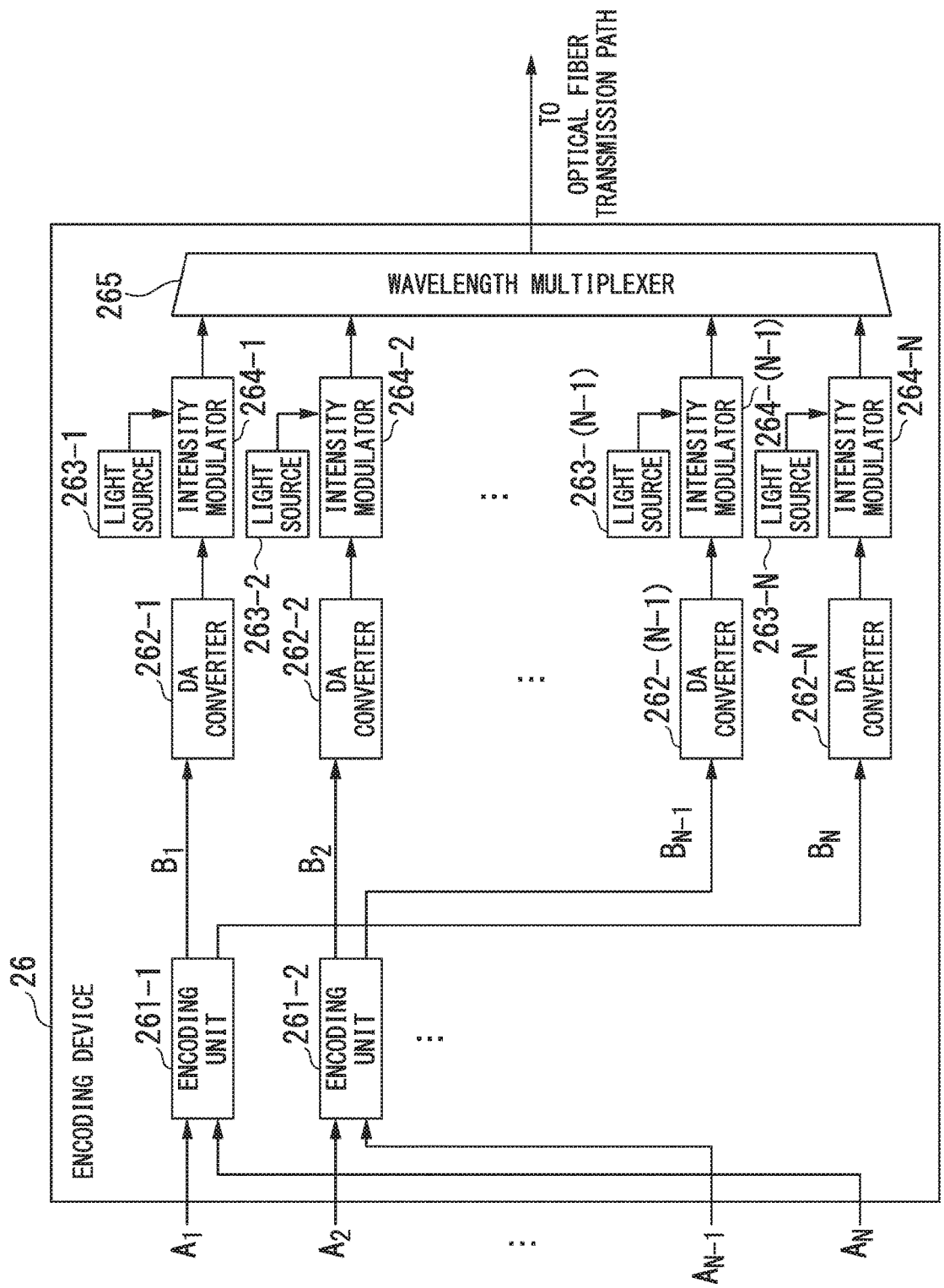
FIG. 14 is a diagram showing a configuration of an encoding device of an optical transmission system according to the fifth embodiment.

FIG. 14 is a diagram showing a configuration of an encoding device 26 of the optical transmission system according to the fifth embodiment. The encoding device 26 includes encoding units 261-1 to 261-L, digital-analog converters (DA converters) 262-1 to 262-N, light sources 263-1 to 263-N, intensity modulators 264-1 to 264-N, and a wavelength multiplexer 265. L=N/2 if N is an even number and L=(N−1)/2 if N is an odd number. First, a case in which N is an even number will be described.

The encoding unit 261-$i$ (i=1, . . . , L) performs encoding similar to that of the encoding unit 211 of the first embodiment on a signal $A_i$ and a signal $A_{N-i+1}$ to generate a signal $B_i$ and a signal $B_{N-i+1}$. That is, the encoding unit 261-$i$ (i=1, . . . , L) performs calculation by designating signals $A_i$, $A_{N-i+1}$, $B_i$, and $B_{N-i+1}$ as signals $A_1$, $A_2$, $B_1$, and $B_2$ in Equation (4). The DA converter 262-$i$ (i=1, . . . , N) converts a digital data signal $B_i$ into an analog electrical signal and outputs a signal $B_i$ converted into the analog electrical signal to the intensity modulator 264-$i$. The light source 263-$i$ (i=1, . . . , N) outputs light having a wavelength of an $i^{th}$ channel. The intensity modulator 264-$i$ (i=1, . . . , N) performs optical amplitude modulation on light input from the light source 263-$i$ according to the signal $B_i$ converted into the analog electrical signal and converts it into an optical signal of the $i^{th}$ channel. The wavelength multiplexer 265 wavelength-multiplexes signals $B_1$ to $B_N$ that are optical signals of first to $N^{th}$ channels input from the intensity modulators 264-1 to 264-N and transmits a wavelength-multiplexed signal generated through wavelength multiplexing to the optical fiber transmission path.

If N is an odd number, the encoding device 26 outputs a signal $A_{(N+1)/2}$ to the DA converter 262-(N+1)/2 as it is without encoding. The other operations are the same as those when N is an even number.

Figure 15:
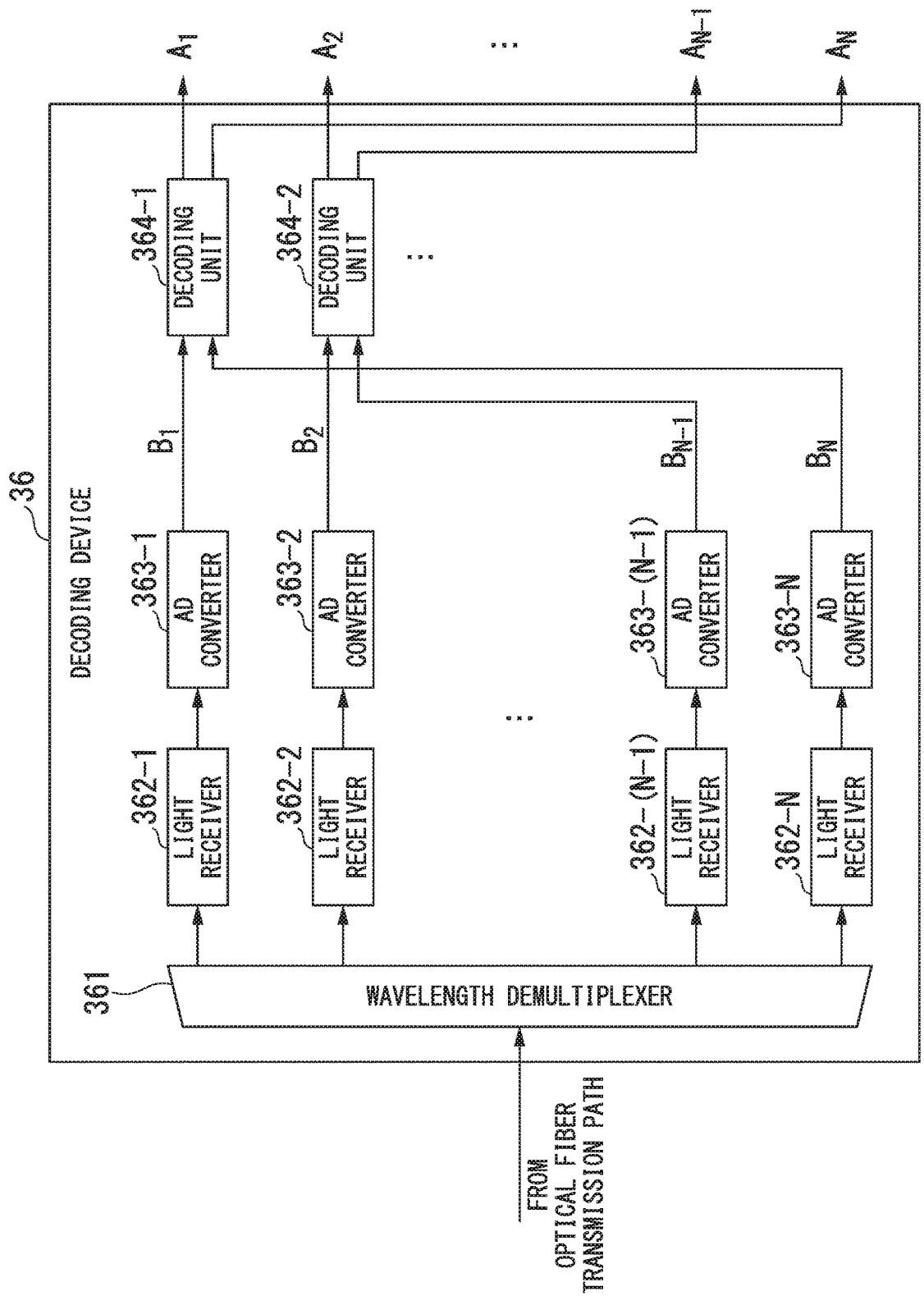
FIG. 15 is a diagram showing a configuration of a decoding device of the optical transmission system according to the fifth embodiment.
Figure 16:
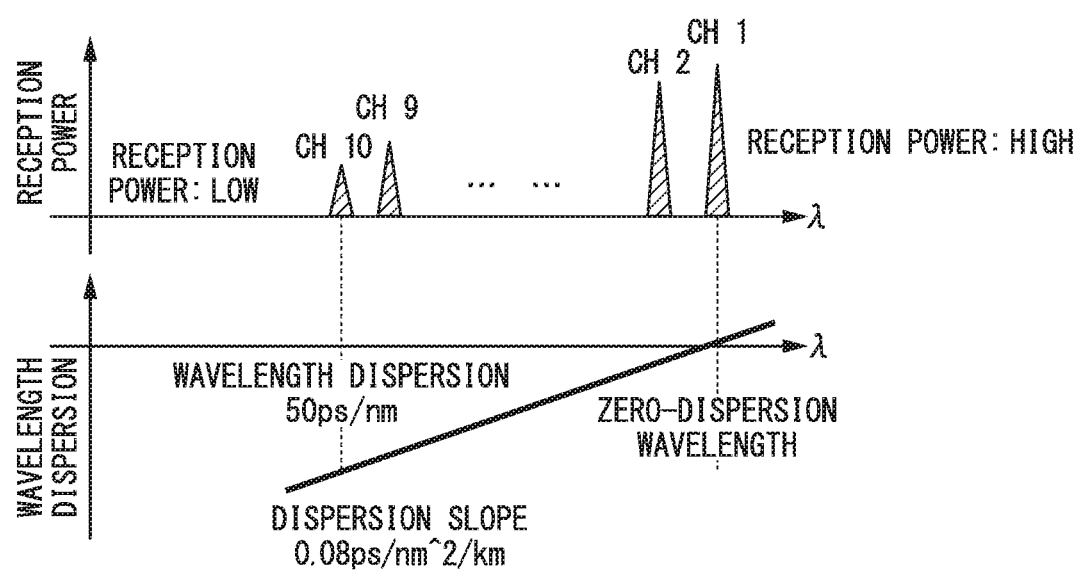
FIG. 16 is a diagram showing reception power and wavelength dispersion for each channel according to related art.

FIG. 15 is a diagram showing a configuration of a decoding device 36 of the optical transmission system according to the fifth embodiment. The decoding device 36 includes a wavelength demultiplexer 361, light receivers 362-1 to 362-N, analog-to-digital converters (AD converters) 363-1 to 363-N, and a decoding unit 364-K. K=N/2 if N is an even number and K=(N+1)/2 if N is an odd number. First, a case in which N is an even number will be described.

The wavelength demultiplexer 361 receives the wavelength-multiplexed signal output from the encoding device 26 shown in FIG. 14 and transmitted through the optical fiber transmission path. The wavelength demultiplexer 361 separates the received optical signal into optical signals of first to $N^{th}$ channels by demultiplexing the received optical signal on the basis of wavelengths and outputs an optical signal of the $i^{th}$ channel (i=1, . . . , N) to the light receiver 362-$i$. The light receiver 362-$i$ (i=1, . . . , N) converts the optical signal of the $i^{th}$ channel into an analog electrical signal and outputs the analog electrical signal to the AD converter 363-$i$. The AD converter 363-$i$ (i=1, . . . , M) converts the analog electrical signal input from the light receiver 362-$i$ into a signal $B_i$ indicating digital data. The decoding unit 364-$i$ (i=1, . . . , K) receives the signal $B_i$ output by the AD converter 363-$i$ and the signal $B_{(N-i+1)}$ output by the AD converter 363-(N−i+1). The decoding unit 364-$i$ (i=1, . . . , K) performs a process similar to that of the decoding unit 314 of the first embodiment or the decoding unit 520 of the second embodiment on the signals $B_i$ and $B_{(N-i+1)}$ to restore the signals $A_i$ and $A_{(N-i+1)}$ before encoding. That is, the decoding unit 364-$i$ (i=1, . . . , K) performs calculation by designating signals $B_i$, $B_{N-i+1}$, $A_i$, and $A_{N-i+1}$ as signals $B_1$, $B_2$, $A_1$, and $A_2$ in Equation (8) or (18).

If N is an odd number, the decoding unit 364-K of the decoding device 36 makes a threshold value determination on a signal $B_K$ to restore a signal $A_K$. The threshold value determination is a process of obtaining a value closest to a value indicated by the signal $B_k$ among (M+1) values that the signal $A_k$ can have. For example, the decoding unit 364-K may compare each of M threshold values determined in accordance with the (M+1) values that the signal $A_k$ can have with the value indicated by the signal $B_k$ and obtain the value closest to the value indicated by the signal $B_k$ on the basis of a comparison result.

As described above, the encoding unit 261-$i$ ($i=1, \ldots, L$) in the encoding device 26 performs a process similar to that of the encoding unit 211 on the two channels in the first embodiment shown in FIG. 2. The decoding unit 364-$i$ ($i=1, \ldots, K$) in the decoding device 36 performs a process similar to that of the decoding unit on the two channels. The configuration of the decoding unit 364-$i$ is similar to the configuration of the decoding unit 314 in the first embodiment shown in FIG. 4 or the configuration of the decoding unit 520 in the second embodiment shown in FIG. 7. The number of decoding units 364-1 to 364-K, K, in the fifth embodiment is N/2. The number of adaptive digital filters required for the decoding unit in the third embodiment is N(N+1). On the other hand, the number of adaptive digital filters required in the fifth embodiment is 3N in total in the case of the decoding unit having a configuration similar to that of the first embodiment. Therefore, by applying the fifth embodiment, it is possible to reduce the number of adaptive digital filters to 3/(N+1). Also, the number of adaptive digital filters required for the encoding unit in the fourth embodiment is $N^2$. On the other hand, the number of adaptive digital filters required in the fifth embodiment is 2N in total in the case of a decoding unit having a configuration similar to that of the second embodiment. Therefore, by applying the present embodiment, it is possible to reduce the number of adaptive digital filters to 2/N. When the number of channels, N, constituting the optical transmission system is larger, the effect of reducing the number of adaptive digital filters is greater.

In the fifth embodiment, a configuration in which encoding and decoding are performed for every (N/2) sets each having PAM signals of two channels among PAM signals of N channels has been described. Encoding and decoding may be performed for every (N/$2^L$) sets each having $2^L$ PAM signals among PAM signals of N channels (L is an integer greater than or equal to 1 and $2^L$ is less than or equal to N). When encoding is performed for every (N/$2^L$) sets each having $2^L$ PAM signals, the encoding unit 261 performs encoding by calculating an inner product of a matrix with elements of $2^L$ PAM signals included in each set and a Hadamard matrix of $2^L$ rows and $2^L$ columns. The encoding unit 261 outputs a signal having a positive value all the time among $2^L$ signals obtained from the inner product calculation as an encoded signal. The encoding unit 261 adds ($2^L$M/2) to a signal in which a negative value is included in an available value among $2^L$ signals obtained from the inner product calculation and outputs an addition result as an encoded signal.

If encoding is performed for every (N/$2^L$) sets each having $2^L$ PAM signals, $2^L$ PAM signals included in each set are selected to minimize variation in an average value of signal qualities of $2^L$ PAM signals included in each set. By selecting $2^L$ PAM signals of each set as described above, the degradation of the signal quality of each channel is equalized, so that the signal quality of the entire optical transmission system is improved. For example, the $2^L$ PAM signals included in each set may be selected as follows.

[First procedure] A PAM signal of a channel with highest signal quality among the N channels is selected as a PAM signal included in a first set. A PAM signal of a channel with $i^{th}$ highest signal quality is selected as a PAM signal included in an $i^{th}$ set ($i=2, 3, \ldots, Q; 2^L Q \leq N$).

[Second procedure] A PAM signal of a channel with lowest signal quality among the N channels is selected as a PAM signal included in the first set. A PAM signal of a channel with $i^{th}$ lowest signal quality is selected as a PAM signal included in the $i^{th}$ set.

[Third procedure] A PAM signal of a channel with $(Q+1)^{th}$ highest signal quality among the N channels is selected as a PAM signal included in the first set. A PAM signal of a channel with $(Q+i)^{th}$ highest signal quality is selected as a PAM signal included in the $i^{th}$ set.

[Fourth Procedure] A PAM signal of a channel with $(Q+1)^{th}$ lowest signal quality among the N channels is selected as a PAM signal included in the first set. A PAM signal of a channel with $(Q+i)^{th}$ lowest signal quality is selected as a PAM signal included in the $i^{th}$ set.

[$(p-1)^{th}$ procedure] A PAM signal of a channel with $(((p-2)Q+2))/2)^{th}$ highest signal quality among the N channels is selected as a PAM signal included in the first set ($p=6, 8, \ldots, 2^L$). A PAM signal of a channel with $(((p-2)Q+2i))/2)^{th}$ highest signal quality is selected as a PAM signal included in the $i^{th}$ set.

[$p^{th}$ procedure] A PAM signal of a channel with $(((p-2)Q+2))/2)^{th}$ lowest signal quality among the N channels is selected as a PAM signal included in the first set. A PAM signal of a channel with $(((p-2)Q+2i))/2)^{th}$ lowest signal quality is selected as a PAM signal included in the $i^{th}$ set.

By performing the above-described first, second, third, fourth, $(p-1)^{th}$, and $p^{th}$ procedures ($p=6, 8, \ldots, 2^L$), $2^L$ PAM signals included in each of Q sets are determined. The procedure of selecting the above-described $2^L$ PAM signals is an example and other selection procedures of minimizing variation in an average value of signal qualities of $2^L$ PAM signals may be used.

The decoding unit 364 may decode a signal for each of (N/$2^L$) sets including $2^L$ PAM signals. When decoding is performed on a set including $2^L$ PAM signals, the decoding unit 364 performs decoding by calculating an inner product of a matrix having elements of $2^L$ PAM signals and a Hadamard matrix of $2^L$ rows and $2^L$ columns. The decoding unit 364 adds $(-M(2^L-1)/2)$ to a signal in which a negative value is not included in a range of available values among signals obtained by dividing a signal obtained from the inner product calculation by $2^L$ and outputs an addition result as a decoding result. The decoding unit 364 adds (M/2) to a signal in which a negative value is included in a range of available values among the signals obtained by dividing the signal obtained from inner product calculation by $2^L$ and outputs an addition result as a decoding result.

The number of PAM signals included in each set may be determined in a range from 2 to N in accordance with the calculation load of the inner product calculation in encoding and decoding. By determining the number of PAM signals included in each set in accordance with the calculation load, it is possible to improve the signal quality while minimizing an increase in the calculation load.

Sixth Embodiment

In a sixth embodiment, a method of calculating the number of taps of the adaptive digital filter of the decoding unit of the above-described embodiment will be described.

As shown in FIG. 5, each embodiment has an effect of equalizing signal quality with respect to not only variation in signal quality due to a difference in reception power between channels but also variation in signal quality due to a difference in the degree of waveform degradation due to wavelength dispersion. A part of waveform degradation due to wavelength dispersion can be compensated for by an adaptive digital filter used for decoding. Therefore, the number of taps of the adaptive digital filter becomes an important parameter for compensating for waveform degradation due to wavelength dispersion.

Because the decoding in each embodiment corresponds to an operation in which a plurality of channels share an influence of wavelength dispersion due to the transmission fiber, it is desirable to make the number of taps of the adaptive digital filter used for the decoding to be equal for all the channels. If encoding is applied to (M+1)-value PAM signals of N channels, attention is paid to a channel subjected to largest wavelength dispersion among the N channels. By determining the number of taps of the adaptive digital filter on the basis of a largest wavelength dispersion value, a larger signal quality improvement effect can be obtained.

A channel subjected to the largest wavelength dispersion among the N channels is assumed to be a $d^{th}$ channel and cumulative wavelength dispersion to which the $d^{th}$ channel is subjected is assumed to have D [ps/nm]. If a modulation rate of the (M+1)-value PAM signal is F [gigabaud (Gbaud)], a symbol period becomes 1000/F [ps]. Also, a bandwidth of a signal spectrum approximately becomes F [GHz]. On the other hand, the optical waveform spread generated in the $d^{th}$ channel by the wavelength dispersion D [ps/nm] is approximately DF/125 [ps] that corresponds to the waveform spread for DF2/125,000 symbols.

For example, if the cumulative wavelength dispersion is 64 ps/nm and the signal modulation rate is 56 Gbaud, the waveform spread due to wavelength dispersion becomes about 29 ps. This corresponds to waveform spread for approximately two symbols. That is, there is a possibility that a synchronization deviation for two symbols will occur. Generally, the adaptive digital filter taps are implemented at intervals of T/2 for a symbol period T of a signal. Therefore, in the present example, by setting the number of taps (a tap length) to 4 or more, an influence of wavelength dispersion can be reduced. If the number of taps is 2 or more, the updating of a vector indicating a tap coefficient $h_{ij}$ is performed using time series (vectors) having the same length as the number of taps for the signals $A_i$, $B_i$, and $C_i$ in Equations (13) to (15), (23), (24), (30) to (32), (38), and (39).

According to the above-described embodiment, the encoding device includes an encoding unit, a wavelength synthesizing unit, N digital-analog conversion units corresponding to the N channels, N light sources, and N light intensity modulation units. The N digital-analog converters are, for example, DA converters 212-1, 212-2, and 232-1 to 232-N. For example, the N light intensity modulation units are intensity modulators 214-1, 214-2, and 234-1 to 234-N. The wavelength multiplexing units are, for example, wavelength multiplexers 215 and 235. The encoding unit inputs N intensity signals (N is an integer greater than or equal to 2) of (M+1) values (M is an integer greater than or equal to 1). The encoding unit performs an encoding process of adding a constant (NM/2) to an encoded signal having a negative minimum value in a range of available values among encoded signals of N channels of (NM+1) values obtained by calculating an inner production of a Hadamard matrix of N rows and N columns and a matrix having elements of N intensity signals so that the minimum value of the range of the encoded signal becomes 0. The encoding process is represented by Equation (5) or represented by Equation (8) when N=2 and M=3. The N digital-to-analog conversion units convert the encoded signals of the corresponding channels from digital signals into electrical analog signals. The N light sources output light of wavelengths used for the corresponding channels. The N light intensity modulation units intensity-modulate the light output from the light sources of the corresponding channels with the encoded signals converted into the electrical analog signal by the digital-analog conversion units of the corresponding channels. The wavelength multiplexing unit outputs a wavelength-multiplexed signal obtained by wavelength-multiplexing the light intensity-modulated by the N light intensity modulation units.

The decoding device includes a wavelength demultiplexing unit, a decoding unit, and N light receiving units and N analog-to-digital conversion units provided for every N channels. The wavelength demultiplexing units are, for example, wavelength demultiplexer 311 or 331. The N light receiving units are, for example, light receivers 312-1 and 312-2, or light receivers 332-1 to 332-N. The N analog-to-digital conversion units are, for example, AD converters 313-1 and 313-2, or AD converters 333-1 to 333-N. The wavelength demultiplexing unit demultiplexes the received wavelength-multiplexed signal into optical signals of N channels on the basis of wavelengths. The N light receiving units convert the optical signals of the channels corresponding to their own functional units among the optical signals of the N channels obtained through demultiplexing performed by the wavelength demultiplexing unit into intensity signals that are electrical signals of (NM+1) values. The N analog-to-digital conversion units convert the intensity signals of the corresponding channels from analog signals to digital signals. The decoding unit performs a decoding process of obtaining a decoded signal. In the decoding process, the decoding unit, divides an inner product of a Hadamard matrix of N rows and N columns and a matrix having elements of the intensity signals converted into the digital signals by the N analog-to-digital conversion units by N. The decoding unit adds a constant (−M(N−1)/2) to a decoded signal having a positive minimum value in a range of available values among decoded signals obtained as results of division and adds a constant (M/2) to a decoded signal having a negative minimum value in the range of available values so that the minimum value of the range of the decoded signal becomes 0. The decoding unit obtains N addition results as N decoded signals of (M+1) values. This decoding process is represented by Equation (7), or represented by Equation (8) when N=2 and M=3.

The decoding unit may include N filter units each having (N+1) adaptive digital filters corresponding to N channels and determination function units corresponding to the N channels. An intensity signal of an $i^{th}$ channel (i is an integer greater than or equal to 1 and less than or equal to N) among the N channels is denoted by $B_i$, a tap coefficient of a $j^{th}$ adaptive digital filter (j is an integer greater than or equal to 0 and less than or equal to N) among (N+1) adaptive digital filters provided in the filter unit corresponding to the $i^{th}$ channel among the N filter units is denoted by $h_{ij}$, digital data after processing by the filter unit corresponding to the $i^{th}$ channel is denoted by $C_i$, and a Hadamard matrix of N rows and N columns is denoted by $H_N$. The filter unit corresponding to the $i^{th}$ channel calculates the digital data $C_i$ according to Equations (27) and (28). For example, if N=2 and M=3, the filter unit calculates the digital data $C_i$ according to Equations (9) and (10). The determination function unit corresponding to the $i^{th}$ channel among the N determination function units makes a threshold value determination on the digital data $C_i$ to decode a signal. An initial value of the tap coefficient $h_{ij}$ is represented by Equations (33) and (34). If N=2 and M=3, the initial value of the tap coefficient $h_{ij}$ is represented by Equations (16) and (17).

Alternatively, the decoding unit may include N filter units each having N adaptive digital filters corresponding to N channels and determination function units corresponding to the N channels. An intensity signal of an $i^{th}$ channel (i is an integer greater than or equal to 1 and less than or equal to N) among the N channels is denoted by $B_i$, a tap coefficient of a $j^{th}$ adaptive digital filter (j is an integer greater than or equal to 1 and less than or equal to N) among N adaptive digital filters provided in a filter unit corresponding to the $i^{th}$ channel among the N filter units is denoted by $h_{ij}$, digital data after processing by the filter unit corresponding to the $i^{th}$ channel is denoted by $C_i$, and a Hadamard matrix of N rows and N columns is denoted by $H_N$. The filter unit corresponding to the $i^{th}$ channel calculates the digital data $C_i$ according to Equation (36). For example, if N=2 and M=3, the filter unit calculates the digital data $C_i$ according to Equations (19) and (20). The determination function unit corresponding to the it channel among the N determination function units makes a threshold value determination on the digital data $C_i$ to decode a signal. An initial value of the tap coefficient $h_{ij}$ is represented by Equation (40), or the initial value of the tap coefficient $h_{ij}$ is represented by Equation (25) if N=2.

The plurality of adaptive digital filters may use the same number of taps determined on the basis of a wavelength dispersion value of a channel having larger wavelength dispersion. For example, the number of taps of all the adaptive digital filters may be determined on the basis of a wavelength dispersion value of a channel having the largest wavelength dispersion among the N channels to be used.

Alternatively, the encoding unit of the encoding device may generate encoded signals of N channels by performing an encoding process. In the encoding process, the encoding unit inputs N intensity signals (N is an integer greater than or equal to 2) of (M+1) values (M is an integer greater than or equal to 1) and calculates an inner product of a Hadamard matrix of $2^L$ rows and $2^L$ columns (L is an integer less than or equal to 1 and $2^L$ is less than or equal to N) and a matrix having elements of $2^L$ intensity signals included in a set for each set of $2^L$ intensity signals. The encoding unit adds a constant ($2^L M/2$) to an encoded signal having a negative minimum value in a range of available values among encoded signals of $2^L$ channels of ($2^L M+1$) values obtained by calculating an inner product so that the minimum value of the range of the encoded signal becomes 0. The encoding unit outputs an encoded signal of an addition result and an encoded signal having a positive value in the range of available values among the encoded signals of the $2^L$ channels of the ($2^L M+1$) values obtained by calculating the inner product as the encoded signals of the N channels. The encoding unit is, for example, encoding units 261-1 to 261-L, and the encoding process is represented by, for example, Equation (4). Each set may include an intensity signal with the $i^{th}$ highest signal quality (i is an integer greater than or equal to 1 and less than or equal to N/2) and an intensity signal with the $i^{th}$ lowest signal quality.

If the encoding device performs an encoding process for each set of $2^L$ intensity signals, the decoding unit of the encoding device performs the following decoding process. The decoding unit divides an inner product of a Hadamard matrix of $2^L$ rows and $2^L$ columns and a matrix having elements of $2^L$ intensity signals included in a set of $2^L$ intensity signals by $2^L$ for each set of $2^L$ intensity signals among the intensity signals of the N channels converted into the digital signals by the N analog-to-digital conversion units. The decoding unit adds a constant ($-M(2^L-1)/2$) to a decoded signal having a positive minimum value in a range of available values among decoded signals obtained by performing the division so that the minimum value of the range of the decoded signal becomes 0 and adds a constant (M/2) to a decoded signal having a negative minimum value in the range of available values so that the minimum value of the range of the decoded signal becomes 0. The decoding unit outputs N addition results as results of the decoding process. The decoding unit is, for example, decoding units 364-1 to 364-K, and the decoding process is represented by Equation (7) if N=2, or represented by Equation (8) if M=3.

According to the above-described embodiment, it is possible to equalize variation in signal quality between channels and improve signal quality in the entire optical transmission system by extracting an appropriate set of channels from a plurality of channels on which an intensity-modulated signal is transmitted and applying Walsh encoding to the set of channels in a multi-channel optical transmission system.

Also, some functions of the encoding devices 2, 21, 23, and 26 and the decoding devices 3, 31, 33, and 36 in the above-described embodiments may be configured to be implemented by a computer. In this case, the functions may be implemented by recording a program for implementing the functions on a computer-readable recording medium and causing a computer system to read and execute the program recorded on the recording medium. The program for implementing the above-described functions can be provided through a network. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" may include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. The above-described program may be used to implement some of the above-described functions. Further, the program may implement the above-described functions in combination with a program already recorded on the computer system.

Although the embodiments of the present invention have been described above in detail with reference to the drawings, the specific configuration is not limited to the embodiments and other designs and the like may also be included without departing from the scope of the present invention.

INDUSTRIAL APPLICABILITY

The present invention is able to be applied to an optical transmission system for transmitting and receiving a wavelength-multiplexed optical signal.

REFERENCE SIGNS LIST

1 Optical transmission system
2,21,23,26 Encoding device
3,31,33,36 Decoding device
201 Encoding unit
202-1 to 202-N Light source 203-1 to 203-N Intensity modulator
204 Wavelength multiplexer
211 Encoding unit
212-1, 212-2 DA converter
213-1, 213-2 Light source
214-1, 214-2 Intensity modulator
215 Wavelength multiplexer
231 Encoding unit
232-1 to 232-N DA converter
233-1 to 233-N Light source
234-1 to 234-N Intensity modulator
235 Wavelength multiplexer
261-1, 261-2 Encoding unit
262-1 to 262-N DA converter
263-1 to 263-N Light source
264-1 to 264-N Intensity modulator
265 Wavelength multiplexer
301 Wavelength demultiplexer
302-1 to 302-N Light receiver
303 Decoding unit
311 Wavelength demultiplexer
312-1, 312-2 Light receiver
313-1, 313-2 AD converter
314 Decoding unit
331 Wavelength demultiplexer
332-1 to 332-N Light receiver
333-1 to 333-N AD converter
334 Decoding unit
361 Wavelength demultiplexer
362-1 to 362-N Light receiver
363-1 to 363-N AD converter
364-1, 364-2 Decoding unit
511-1, 511-2 Addition unit
512-1, 512-2 Determination function unit
513-1, 513-2 Calculation unit
514-1, 514-2 Feedback unit
520 Decoding unit
521-1, 521-2 Normalization unit
522 Addition unit
523-1, 523-2 Addition unit
524-1, 524-2 Determination function unit
525-1, 525-2 Calculation unit
526-1, 526-2 Feedback unit
531-1 to 531-N Addition unit
532-1 to 532-N Determination function unit
533-1 to 533-N Calculation unit
534-1 to 534-N Feedback unit
540 Decoding unit
541-1 to 541-N Normalization unit
542-N Addition unit
543-1 to 543-N Addition unit
544-1 to 544-N Determination function unit
545-1 to 545-N Calculation unit
546-1 to 546-N Feedback unit
$h_{10}$ to $h_{NN}$ Adaptive digital filter

The invention claimed is:

1. An encoding device, comprising:
an encoding unit configured to perform an encoding process of inputting N intensity signals (N is an integer greater than or equal to 2) of (M+1) values (M is an integer greater than or equal to 1) and adding (NM/2) to an encoded signal having a negative minimum value in a range of the encoded signal among encoded signals of N channels of (NM+1) values obtained by calculating an inner product of a Hadamard matrix of N rows and N columns and a matrix having elements of the N intensity signals;
N digital-to-analog conversion units corresponding to the N channels and configured to convert the encoded signals of the N channels from digital signals into electrical analog signals;
N light sources corresponding to the N channels and configured to output light of wavelengths for use in the N channels;
N light intensity modulation units corresponding to the N channels and configured to intensity-modulate the light output from the N light sources with the encoded signals converted into the electrical analog signals by the N digital-to-analog conversion units; and
a wavelength multiplexing unit configured to output a wavelength-multiplexed signal obtained by wavelength-multiplexing the light intensity-modulated by the N light intensity modulation units.

2. An encoding device, comprising:
an encoding unit configured to perform an encoding process of inputting N intensity signals (N is an integer greater than or equal to 2) of (M+1) values (M is an integer greater than or equal to 1) and adding ($2^L M/2$) (L is an integer less than or equal to 1 and $2^L$ is less than or equal to N) to an encoded signal having a negative minimum value in a range of the encoded signal among encoded signals of $2^L$ channels of ($2^L M+1$) values obtained by calculating an inner product of a Hadamard matrix of $2^L$ rows and $2^L$ columns and a matrix having elements of $2^L$ intensity signals included in a set for each set of $2^L$ intensity signals and generate encoded signals of N channels;
N digital-to-analog conversion units corresponding to the N channels and configured to convert the encoded signals of the N channels from digital signals into electrical analog signals;
N light sources corresponding to the N channels and configured to output light of wavelengths for use in the N channels;
N light intensity modulation units corresponding to the N channels and configured to intensity-modulate the light output from the N light sources with the encoded signals converted into the electrical analog signals by the N digital-to-analog conversion units; and
a wavelength multiplexing unit configured to output a wavelength-multiplexed signal obtained by wavelength-multiplexing the light intensity-modulated by the N light intensity modulation units.

3. The encoding device according to claim 2, wherein the $2^L$ intensity signals included in each set of intensity signals are selected so that variation in an average value of signal qualities of the $2^L$ intensity signals included in each set of intensity signals is minimized.

4. The encoding device according to claim 2, wherein, if L=1, an $i^{th}$ set (i is an integer greater than or equal to 1 and less than or equal to N/2) among sets of signal intensities includes the intensity signal having $i^{th}$ highest signal quality and the intensity signal having $i^{th}$ lowest signal quality among the N intensity signals.

* * * * *